US008074184B2

(12) United States Patent
Garside et al.

(10) Patent No.: US 8,074,184 B2
(45) Date of Patent: Dec. 6, 2011

(54) MODIFYING ELECTRONIC DOCUMENTS WITH RECOGNIZED CONTENT OR OTHER ASSOCIATED DATA

(75) Inventors: Adrian James Garside, Sammamish, WA (US); David Vaughn Winkler, Seattle, WA (US); Joshua Clow, Bellevue, WA (US)

(73) Assignee: Mocrosoft Corporation, Redmond, WA (US)

( * ) Notice: Subject to any disclaimer, the term of this patent is extended or adjusted under 35 U.S.C. 154(b) by 933 days.

(21) Appl. No.: 10/703,081

(22) Filed: Nov. 7, 2003

(65) Prior Publication Data
US 2005/0099398 A1    May 12, 2005

(51) Int. Cl.
*G06F 3/048* (2006.01)

(52) U.S. Cl. ........ 715/854; 715/810; 715/812; 715/813; 715/816; 715/817; 715/818; 715/819; 715/820; 715/825; 715/845; 715/268; 715/230; 715/232; 382/186

(58) Field of Classification Search .................. 345/179; 715/810, 812, 813, 816, 817, 818, 819, 820, 715/825, 845, 854
See application file for complete search history.

(56) References Cited

U.S. PATENT DOCUMENTS

| | | | | |
|---|---|---|---|---|
| 5,502,774 A * | 3/1996 | Bellegarda et al. | ........... | 382/159 |
| 5,522,022 A * | 5/1996 | Rao et al. | ....................... | 345/440 |
| 5,537,526 A * | 7/1996 | Anderson et al. | ............. | 715/515 |
| 5,687,364 A * | 11/1997 | Saund et al. | ........................ | 704/5 |
| 5,909,667 A * | 6/1999 | Leontiades et al. | ............. | 704/275 |
| 6,005,973 A * | 12/1999 | Seybold et al. | ............. | 382/187 |
| 6,029,175 A * | 2/2000 | Chow et al. | ........................... | 1/1 |
| 6,041,335 A * | 3/2000 | Merritt et al. | ................. | 715/203 |
| 6,065,026 A * | 5/2000 | Cornelia et al. | ............... | 715/531 |
| 6,081,814 A * | 6/2000 | Mangat et al. | ................. | 715/205 |
| 6,108,272 A * | 8/2000 | Fox | ............................... | 367/131 |
| 6,111,985 A * | 8/2000 | Hullender et al. | ............. | 382/229 |
| 6,340,967 B1 * | 1/2002 | Maxted | ......................... | 345/179 |
| 6,411,733 B1 * | 6/2002 | Saund | ............................ | 382/190 |
| 6,493,464 B1 * | 12/2002 | Hawkins et al. | .............. | 382/189 |
| 6,766,494 B1 * | 7/2004 | Price et al. | ..................... | 715/203 |
| 6,836,759 B1 * | 12/2004 | Williamson et al. | .......... | 704/235 |
| 6,903,751 B2 * | 6/2005 | Saund et al. | ................... | 345/619 |
| 7,283,670 B2 * | 10/2007 | Wakeam et al. | .............. | 382/186 |
| 7,468,801 B2 * | 12/2008 | Wakeam et al. | ............. | 358/1.14 |
| 7,502,805 B2 * | 3/2009 | Wakeam et al. | ....................... | 1/1 |

(Continued)

OTHER PUBLICATIONS ask-search-q=linked+support+document&search=&qsrc=0—Aug. 14, 2011.*

(Continued)

*Primary Examiner* — Boris Pesin
*Assistant Examiner* — John Heffington
(74) *Attorney, Agent, or Firm* — Shook, Hardy & Bacon LLP

(57) ABSTRACT

Systems and methods enhance editing capabilities associated with a wide variety of different types of electronic documents. Such systems and methods may include a processor that maintains an electronic document having a first portion (e.g., an individual word, character, character string, or the like) provided by a recognizer (e.g., by handwriting or speech recognition software), and they may provide access to potential alternative characters, words, or character strings generated by the recognizer during various user editing functions and operations. Other data associated with the first portion of the document also may be stored and made available to the user during various functions and operations. This invention further relates to computer-readable media including instructions for performing various methods and/or operating various systems for editing electronic documents, including systems and methods like those described above.

34 Claims, 10 Drawing Sheets

U.S. PATENT DOCUMENTS

| | | | |
|---|---|---|---|
| 7,502,812 B2 * | 3/2009 | Wakeam et al. | 1/1 |
| 7,533,338 B2 * | 5/2009 | Duncan et al. | 715/268 |
| 7,725,493 B2 * | 5/2010 | Saund | 707/797 |
| 2003/0025675 A1 * | 2/2003 | Dresevic et al. | 345/173 |
| 2003/0050929 A1 * | 3/2003 | Bookman et al. | 707/7 |
| 2004/0044659 A1 * | 3/2004 | Judd et al. | 707/3 |
| 2004/0090439 A1 * | 5/2004 | Dillner | 345/440 |
| 2004/0168126 A1 * | 8/2004 | Dunietz et al. | 715/525 |
| 2005/0097453 A1 * | 5/2005 | Simonyi | 715/513 |

OTHER PUBLICATIONS ask-search-qsrc=1&o=0&1=dir&q=linked+expanded+docum+text+injector—Aug. 14, 2011.* ask-search-qsrc=1&o=0&1=dir&q=linked+expanded+docum—Aug. 14, 2011.* ask-search-qsrc=1&o=0&I=dir&q=linked+expanded+docum-selectable-alternative—Aug. 14, 2011.*

* cited by examiner

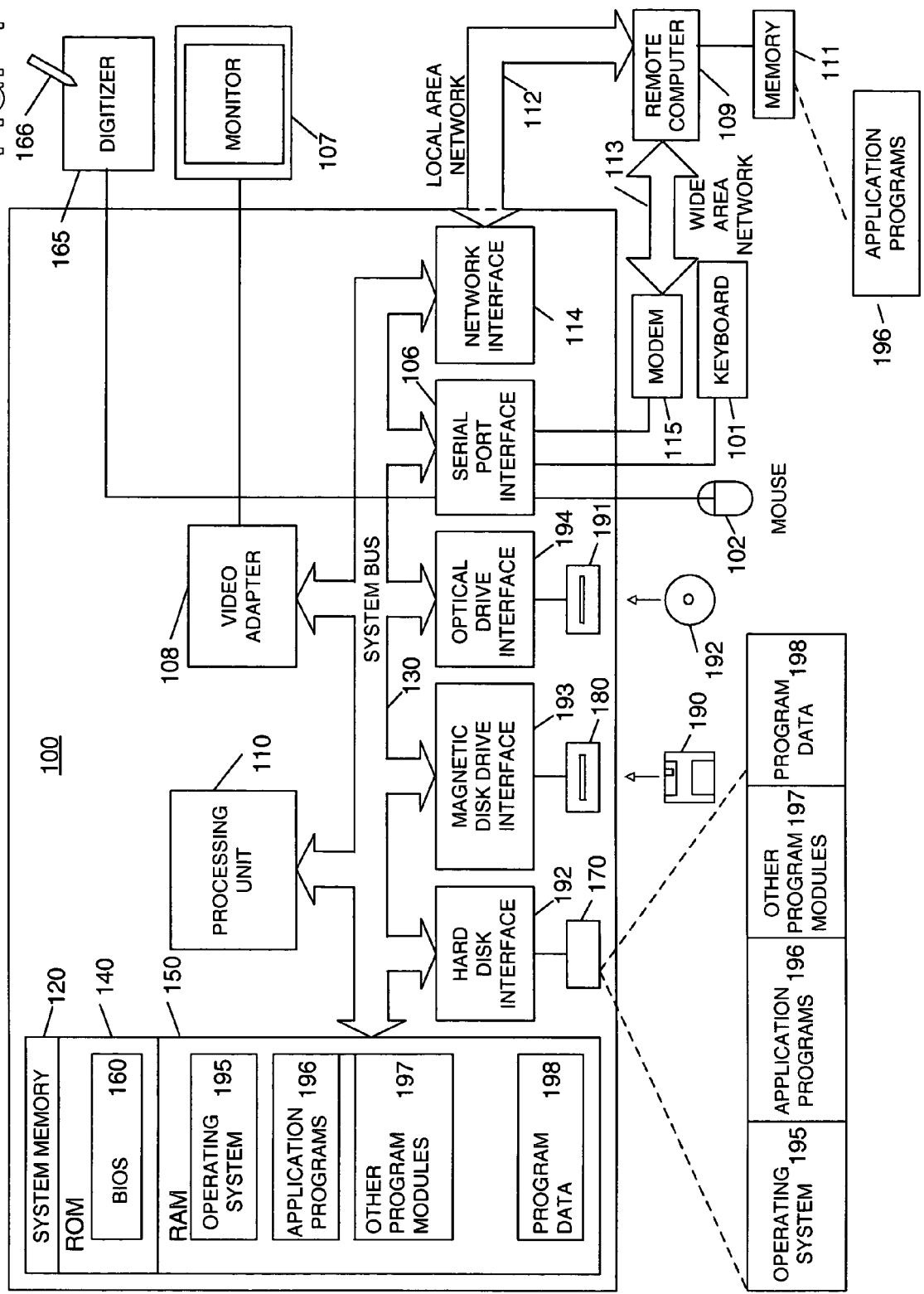

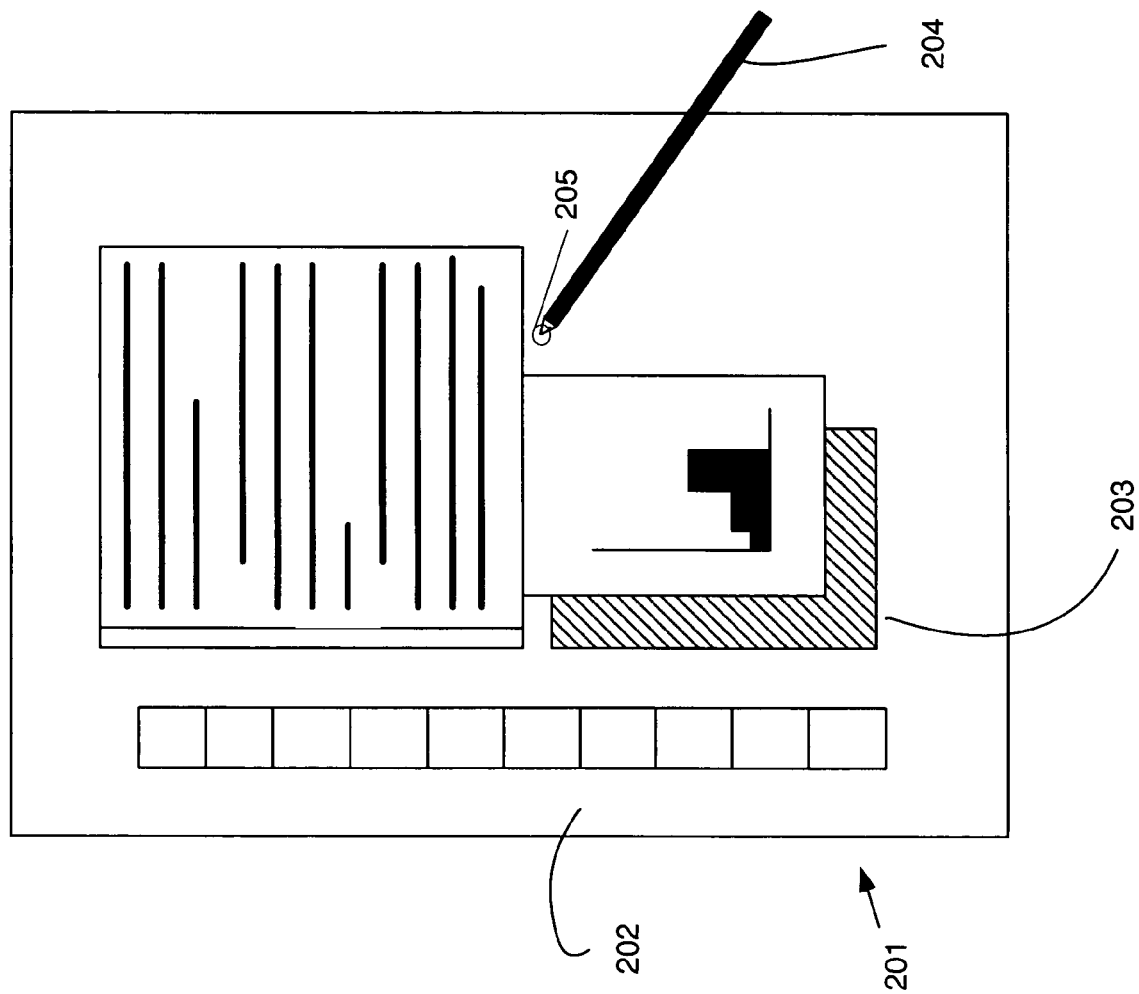

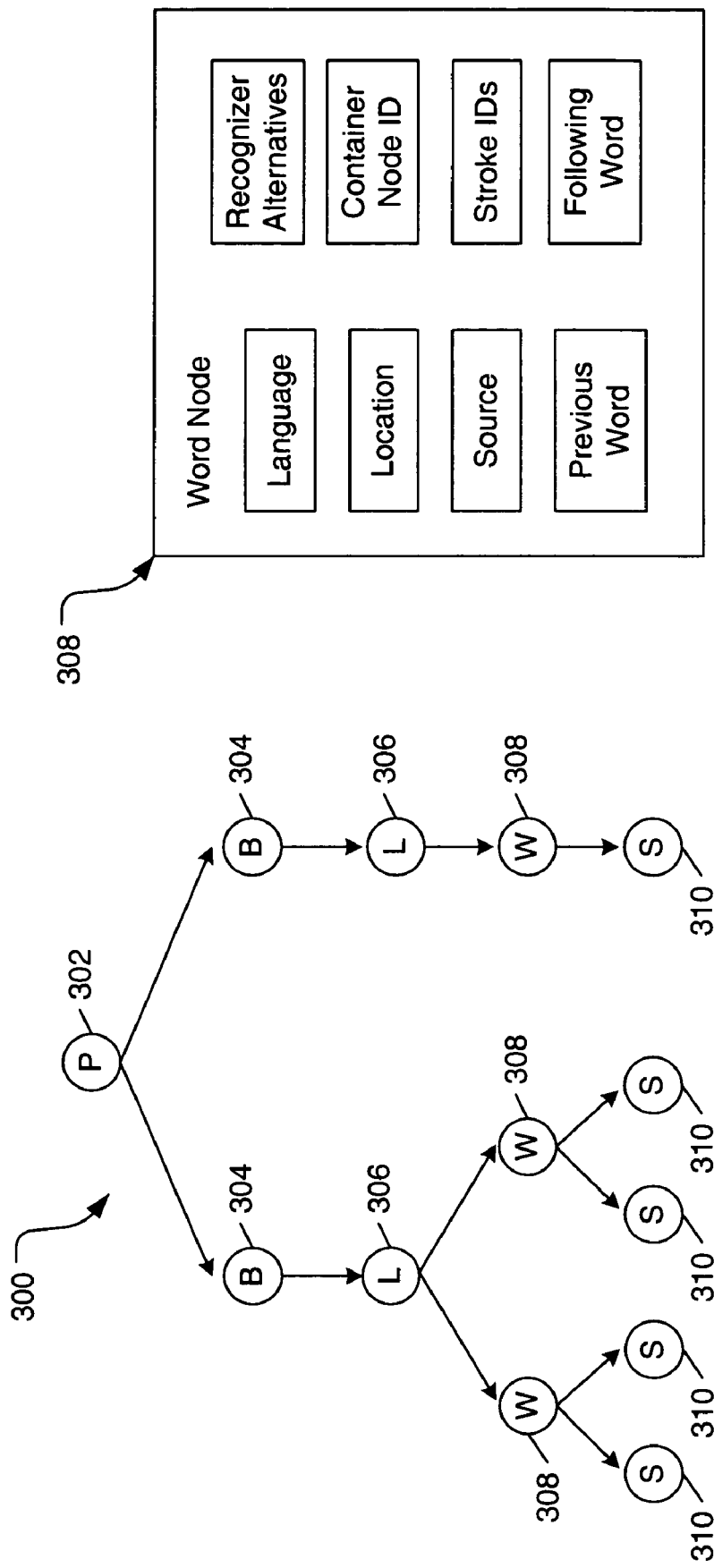

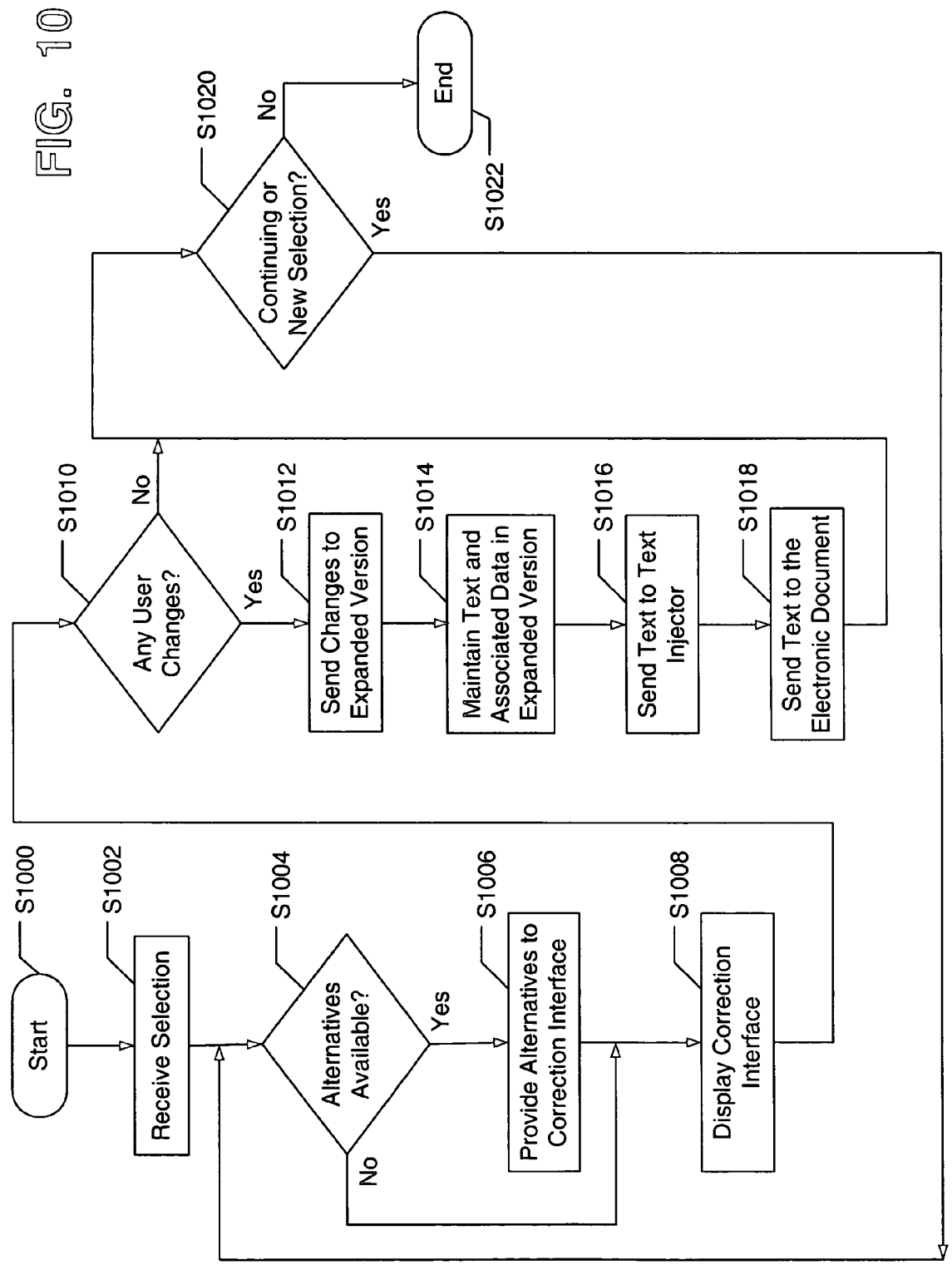

MODIFYING ELECTRONIC DOCUMENTS WITH RECOGNIZED CONTENT OR OTHER ASSOCIATED DATA

FIELD OF THE INVENTION

The present invention generally relates to systems and methods that enhance modifying and editing capabilities and other features associated with electronic documents. Some advantageous aspects of the invention can be realized when modifying or editing documents containing at least some content generated by recognizer systems, such as handwriting recognition systems, speech recognition systems, and the like, and/or content including available alternative data, such as alternatives provided by spell-checking or grammar-checking systems, alternatives provided by thesaurus programs, alternatives from storage of personalization or customization data, and the like.

BACKGROUND

Typical computer systems, especially computer systems using graphical user interfaces (GUIs), are optimized for accepting user input from one or more discrete input devices, such as a keyboard for entering text, and a pointing device, such as a mouse with one or more buttons, for operating the user interface. An example of such a GUI is the user interface for the Windows® computer operating system (available from Microsoft Corporation of Redmond, Wash.). The ubiquitous keyboard and mouse interface provides for fast creation and modification of documents, spreadsheets, database fields, drawings, photos, web pages, emails, and the like.

Recently, however, pen-based computing systems, such as tablet PCs and the like, have been increasing in popularity. In pen-based computing systems, user input advantageously may be introduced as electronic ink using an electronic "pen" or stylus (e.g., mimicking writing with a pen or pencil on a piece of paper). Indeed, in at least some pen-based computing systems, all user input is capable of being entered and manipulated using an electronic pen input device, and the user interface is fully controllable using only the electronic pen.

As pen-based computing systems become more popular, users are increasingly entering more data in the form of electronic ink. In many instances, users may wish to convert the original electronic ink data to machine-generated text, i.e., text suitable for use and manipulation by conventional word processing programs, spreadsheet programs, email programs, document management programs, web browsers, etc. While handwriting recognition technology for converting handwritten electronic ink text to machine-generated text has improved in recent years, recognizers of this type still are somewhat error prone, particularly for users with poor handwriting, users that write at an angle, and/or users that write very quickly. Additionally, because such systems typically rely on conventional dictionaries, specialized terms, abbreviations, acronyms, and the like often are not correctly recognized. Accordingly, machine-generated text produced by a recognizer often still needs to be corrected and/or otherwise changed or edited by the user.

Handwriting recognizers (and other recognition systems (such as speech recognition systems), spell-check systems, grammar check systems, thesaurus programs, and the like) typically make their best efforts to produce the correct machine-generated text, but these systems recognize that errors occur. Accordingly, conventional recognizers and other programs typically produce a list of potential alternative words or characters for at least some of the recognized text, and they make this information available to the user, e.g., as the program is running on a document or a selection within a document. While the availability of these potential alternatives can greatly enhance and speed up the editing process, once the program is closed or a correction is made, this potential alternative data typically is lost and/or unavailable to the user. Additionally, when the machine-generated text is introduced into another application program or document, the potential alternative data is not (or cannot be) maintained by the new application program or document, and therefore, it is no longer available to the user. Accordingly, if further edits or changes are desired, a user must resort to other editing techniques that do not use the previously generated alternatives, or, if possible, he or she must rerun the original program to again obtain a listing of alternatives.

At least some existing user interfaces for editing, changing, and/or correcting machine-generated text using only an electronic pen and a pen-based computing system can be awkward, cumbersome, and difficult to use. For example, in at least some systems, users can call up and use a soft keyboard and the pen to edit text. Soft keyboards, however, can be slow, cumbersome, and frustrating to use, particularly when a large amount of text must be reviewed and edited. In still other instances, a user may attach and/or use a hard keyboard with a pen-based computing system to edit text. Some users, however, do not wish to use these keyboards, and the requirement to keep a hard keyboard available for editing can make the computing system larger, heavier, and more difficult to handle.

The above-noted difficulties in using electronic pens and pen-based computing systems to modify or edit machine-generated text and documents can lead to user frustration, and it can hamper use and adoption of the pen-based computing system. Accordingly, there is a need in the art for improved modifying and editing capabilities for use in a wide variety of application programs and document types that allow users to quickly, easily, and efficiently access, review, edit, and change machine-generated text using electronic ink and/or an electronic pen associated with a pen-based computing system.

SUMMARY

Aspects of the present invention relate to systems and methods that enhance editing capabilities and other features associated with use of and interaction with electronic documents. Such systems and methods may include a processor programmed and adapted to maintain an electronic document, wherein at least a first portion of content in the electronic document (e.g., an individual word or character or the like) includes content generated by a recognizer (e.g., a handwriting recognizer, a speech recognizer, or the like). The systems and methods further may store data associated with the first portion of the content in a data structure that includes information not included in the electronic document. This data structure may include, in at least some examples, an expanded version of at least a portion of the electronic document (also called a "backing store document" in this specification) that stores information in addition to that maintained in the actual electronic document itself (such as, alternative words or characters generated by the recognizer). Systems and methods according to some examples of the invention further may include an input device that receives input selecting the first portion of the content, and once that portion is selected, the processor further may be programmed and adapted to provide at least one selectable alternative for the first portion of the content based at least in part on the stored data associated with the first portion. If this alternative is then selected, e.g., by user input, the content of the electronic document may be changed to correspond to the selected alternative.

Additional aspects of the invention relate to systems and methods that include: (a) receiving input in an electronic document, wherein the electronic document includes a data structure having a plurality of independent data sets (e.g., data sets representing individual words and/or characters and/or character strings in the electronic document); and (b) maintaining a supporting data structure based on content in at least a portion of the electronic document, wherein the supporting data structure includes a plurality of supporting data sets such that at least some of the independent data sets in the electronic document include an associated supporting data set in the supporting data structure. The supporting data sets in the supporting data structure may include, for example, potential alternative words, characters, and/or character strings generated by a recognition system, a spell-check or grammar check system, a thesaurus programs, alternatives from storage of personalization or customization information, or other relevant data relating to the data sets contained in the electronic document. The supporting data structure may include an expanded copy of the electronic document including the additional data, such as potential alternatives generated by a handwriting or speech recognition system. A user may request display of or access to information contained in at least one supporting data set (e.g., by requesting display of a correction interface, by selecting a word, character, or character string in the electronic document, etc.), and he/she can edit the electronic document, if appropriate, using information (e.g., the potential alternatives) stored in the supporting data set.

Still additional aspects of the invention relate to computer-readable media including computer-executable instructions stored thereon for performing various methods and/or operating various systems for modifying electronic documents, including systems and methods like those described above.

BRIEF DESCRIPTION OF THE DRAWINGS

The above and other objects, features, and advantages of the present invention will be more readily apparent and more fully understood from the following detailed description, taken in conjunction with the appended drawings, in which:

FIG. 1 illustrates a schematic diagram of a general-purpose digital computing environment in which at least some aspects of the present invention may be implemented;

FIG. 2 illustrates a pen-based personal computing (PC) environment in which at least some aspects of the present invention may be implemented;

FIG. 3 illustrates an example data structure that may be used in conjunction with various electronic documents provided in systems and methods according to some examples of the invention;

FIG. 4 illustrates an example data structure that may be used in conjunction with various words or character strings provided in systems and methods according to some examples of the invention;

FIG. 10 illustrates an example of making corrections using electronic ink and/or a pen-based computing system in accordance with at least some examples of the invention.

When the same reference number is used in more than one of the attached drawings, it is intended to refer to the same or similar parts, features, or steps in the various different drawings.

DETAILED DESCRIPTION

Figure 5A:
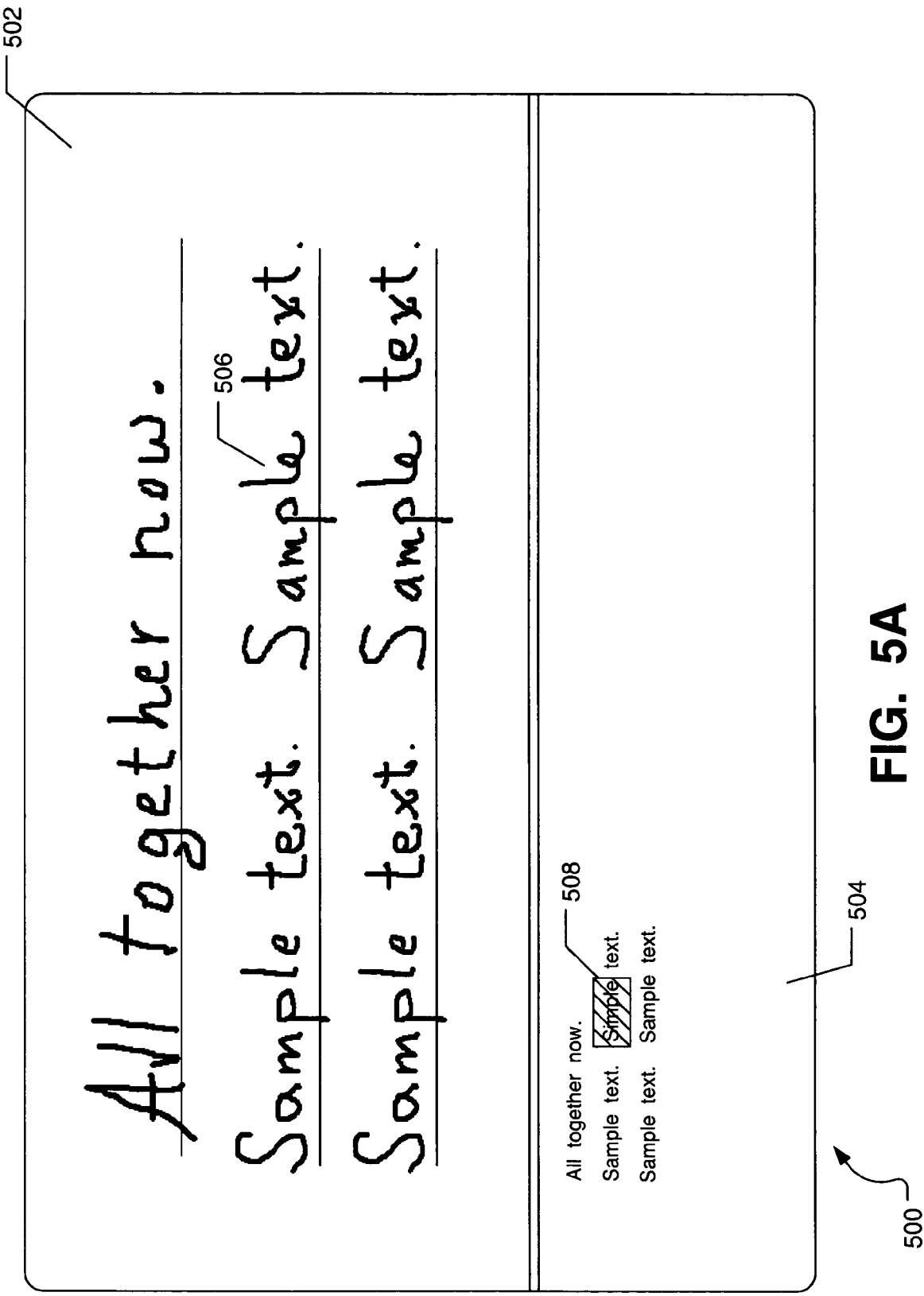
FIGS. 5A and 5B illustrate an example correction interface that may be used in at least some examples of systems and methods according to this invention.

As described above, aspects of the present invention relate to systems, methods, and computer-readable media for processing electronic data and interacting with electronic text, e.g., when modifying or editing electronic documents. The following description is divided into sub-sections to assist the reader. The sub-sections include: Terms; General Description of Various Aspects of the Invention; Example Hardware; Example Systems, Methods, and Computer-Readable Media According to the Invention; and Conclusion.

I. Terms

The following terms are used in this specification and, unless otherwise specified or clear from the context, the terms have the meanings provided below:

"Pen"—Any type of user input device useful in entering electronic ink into and/or otherwise manipulating or controlling an electronic document, a user interface, and/or a computer operating system. The terms "pen" and "stylus" are used interchangeably in this specification.

"Pen-Down Event"—An event that is initiated at the time a pen contacts a digitizer. Typically, a pen-down event will end at the time the pen leaves the digitizer surface (also called a "pen-up event" in this specification). Electronic ink data may be collected based on movement of a pen between a pen-down event and a pen-up event, e.g., as an ink stroke or in other conventional manners as are known in the art.

"Hover"—Positioning or locating a pen proximate or adjacent to a digitizer surface but not in contact with the surface. No specific time period or cessation of motion at a particular location or position is necessary to constitute a "hover" action, although the pen may remain still during a hover event. As an example, a "hover" event may occur or be recognized during the time period that a user continuously moves a pen toward and into contact with a digitizer surface.

"Render" or "Rendered" or "Rendering"—The process of determining how information (including text, graphics, and/ or electronic ink) is to be displayed, whether on a screen, printed, or output in some other manner.

"Computer-Readable Medium" means any available media that can be accessed by a user on a computer system. "Computer storage media" includes volatile and nonvolatile, removable and non-removable media implemented in any method or technology for storage of information, such as computer-readable instructions, data structures, program modules or other data. "Computer storage media" includes, but is not limited to, RAM, ROM, EEPROM, flash memory or other memory technology; CD-ROM, digital versatile disks (DVD) or other optical storage devices, magnetic cassettes, magnetic tape, magnetic disk storage or other magnetic storage devices; or any other medium that can be used to store the desired information and that can be accessed by a computer. Combinations of any of the above should also be included within the scope of "computer-readable media."

II. General Description of Various Aspects of the Invention

As generally described above, aspects of the present invention relate to systems and methods that enhance modifying or editing capabilities and other functions associated with use of and interaction with electronic documents. Such systems and methods may include: (a) a processor programmed and adapted (i) to maintain an electronic document, wherein at least a first portion of content in the electronic document (e.g., an individual word, character, or character string) includes content generated by a recognizer, and (ii) to store data associated with the first portion of the content, wherein the data is stored in a data structure that includes information not included in the electronic document (e.g., in an expanded version of the electronic document or a backing store electronic document); and (b) an input device that receives input selecting the first portion of the content. The processor further may be programmed and adapted to provide at least one selectable alternative for the first portion of the content based at least in part on the stored data associated with the first portion. Once an alternative is selected, e.g., through user input, the content of the electronic document may be changed to correspond to the selected alternative.

Systems and methods according to at least some examples of the invention are particularly useful for processing various edit functions in electronic documents in which at least some of the content in the document (e.g., the "first portion" of the content described above) is generated by a recognition program or engine, such as a speech recognition program or a handwriting recognition program. In such systems and methods, the stored data associated with the first portion of the content of the electronic document may include potential alternative characters, words, or character strings identified by the recognizing program or engine when recognition occurred. If desired, in at least some examples, the stored data associated with the first portion of the content may include a supporting version of the electronic document and/or an expanded version of the electronic document, maintained separate from the electronic document, and the data associated with the first portion of the content (such as the potential alternative characters, words, or character strings as described above) may be included in one or more properties stored in the expanded copy of the electronic document but not included in or useful by the actual electronic document.

Systems and methods according to various examples of the invention further may include: (a) receiving input changing the content of the electronic document (e.g., through a correction interface); and (b) changing the stored data associated with the first portion of the content of the electronic document, if necessary, based on the input changing the content of the electronic document. Additionally, input and corresponding synchronizing changes may take place in the other direction. For example, at least some examples of systems and methods according to the invention further may include: (a) receiving input changing the stored data associated with the first portion of the content of the electronic document (e.g., via a correction interface); and (b) changing the electronic document, if necessary, based on the input changing the stored data. In these manners, the separately stored data associated with the first portion of the content of the electronic document will remain up to date and/or synchronized with respect to the content of the electronic document, and vice versa.

Additional aspects of the invention relate to systems and methods that include: (a) receiving input in an electronic document, wherein the electronic document includes a data structure having a plurality of independent data sets; (b) maintaining a supporting data structure based on content in at least a portion of the electronic document, wherein the supporting data structure includes a plurality of supporting data sets such that at least some of the independent data sets in the electronic document include an associated supporting data set in the supporting data structure; and (c) receiving input requesting display of or access to information contained in at least one supporting data set. In such systems and methods, at least some of the independent data sets may correspond to words, characters, or character strings in the electronic document, and at least some of the supporting data sets may store potential alternative words, characters, or character strings corresponding to the words, characters, or character strings stored in their associated independent data sets. As above, the potential alternative words, characters, or character strings may be generated by a recognition program or engine, such as a speech recognizer or a handwriting recognizer. The potential alternative characters, words, or character strings also may be generated and/or made available from other sources, such as from spell-checking or grammar-checking programs, from thesaurus programs, from storage of personalization or customization data, and the like.

If desired, in at least some examples, the supporting data structure may include a separate, expanded version of the electronic document, wherein at least some of the supporting data sets in the expanded version include one or more properties, objects, or other data associated with its corresponding independent data set in the electronic document. The potential alternatives, as described above, may be stored as one or more properties in the supporting data sets.

Systems and methods according to these various aspects of the invention further may: (a) receive input selecting information from the supporting data set(s); and (b) change the electronic document based on the selected information. Additionally, such systems and methods may receive input changing the electronic document's data structure or the supporting data structure. Receipt of such changes may be used to produce corresponding changes in the other data structure, if necessary, so that the content of the electronic document's data structure and the content of the supporting data structure remain synchronized.

The supporting data stored relating to content in the electronic document is not limited to potential alternative characters, words, or character strings generated by a recognition program or other alternative data. Any suitable or desired data may be stored and associated with a portion of the electronic document without departing from the invention (e.g., as a property, object, or other data associated with a word, character, or other content in the electronic document). For example, the stored data may include alternatives generated by a spell-checking or grammar-checking program or engine, by a thesaurus program or engine, from storage of personalization or customization data, and the like. As additional examples, the stored supporting data further may include information such as: the language of a word, character, or character string; an identifier of a word, character, or character string source (e.g., a globally unique identifier ("GUID") of the program, input, user, or other source of a word, character, or character string in an electronic document); the original electronic ink data associated with a word, character, or character string; the time of input of the word, character, or character string; spacing data associated with the word, character, or character string; and the like.

Aspects of the invention also relate to computer-readable media including computer-executable instructions stored thereon for modifying or editing electronic documents in the manner described above, as well as for performing various methods and/or operating various systems like those described above.

III. Example Hardware

FIG. 1 illustrates a schematic diagram of a general-purpose digital computing environment that can be used to implement various aspects of the present invention. In FIG. 1, a computer 100 includes a processing unit 110, a system memory 120, and a system bus 130 that couples various system components including the system memory 120 to the processing unit 110. The system bus 130 may be any of several types of bus structures including a memory bus or memory controller, a peripheral bus, and a local bus using any of a variety of bus architectures. The system memory 120 may include read only memory (ROM) 140 and random access memory (RAM) 150.

A basic input/output system 160 (BIOS), which contains the basic routines that help to transfer information between elements within the computer 100, such as during start-up, is stored in the ROM 140. The computer 100 also may include a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. These drives and their associated computer-readable media provide nonvolatile storage of computer-readable instructions, data structures, program modules, and other data for the personal computer 100. It will be appreciated by those skilled in the art that other types of computer-readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140, or RAM 150, including an operating system 195, one or more application programs 196, other program modules 197, and program data 198. A user can enter commands and information into the computer 100 through input devices, such as a keyboard 101 and pointing device 102 (such as a mouse). Other input devices (not shown) may include a microphone, joystick, game pad, satellite dish, scanner, or the like. These and other input devices often are connected to the processing unit 110 through a serial port interface 106 that is coupled to the system bus 130, but they also may be connected by other interfaces, such as a parallel port, game port, or a universal serial bus (USB), and the like. Further still, these devices may be coupled directly to the system bus 130 via an appropriate interface (not shown).

A monitor 107 or other type of display device also may be connected to the system bus 130 via an interface, such as a video adapter 108. In addition to the monitor 107, personal computers typically include other peripheral output devices (not shown), such as speakers and printers. In one example, a pen digitizer 165 and accompanying pen or stylus 166 are provided in order to digitally capture freehand input. Although a connection between the pen digitizer 165 and the serial port interface 106 is shown in FIG. 1, in practice, the pen digitizer 165 may be directly coupled to the processing unit 110, or it may be coupled to the processing unit 110 in any suitable manner, such as via a parallel port or another interface and the system bus 130 as is known in the art. Furthermore, although the digitizer 165 is shown apart from the monitor 107 in FIG. 1, the usable input area of the digitizer 165 may be co-extensive with the display area of the monitor 107. Further still, the digitizer 165 may be integrated in the monitor 107, or it may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and it typically includes many or all of the elements described above relative to the computer 100, although for simplicity, only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet, using both wired and wireless connections.

When used in a LAN networking environment, the computer 100 is connected to the local area network 112 through a network interface or adapter 114. When used in a WAN networking environment, the personal computer 100 typically includes a modem 115 or other means for establishing a communications link over the wide area network 113, such as the Internet. The modem 115, which may be internal or external to the computer 100, may be connected to the system bus 130 via the serial port interface 106. In a networked environment, program modules depicted relative to the personal computer 100, or portions thereof, may be stored in the remote memory storage device.

It will be appreciated that the network connections shown are examples and other techniques for establishing a communications link between the computers can be used. The existence of any of various well-known protocols such as TCP/IP, Ethernet, FTP, HTTP, UDP, and the like is presumed, and the system can be operated in a user-server configuration to permit a user to retrieve web pages from a web-based server. Any of various conventional web browsers can be used to display and manipulate data on web pages.

Although the FIG. 1 environment shows one example environment, it will be understood that other computing environments also may be used. For example, one or more examples of the present invention may use an environment having fewer than all of the various aspects shown in FIG. 1 and described above, and these aspects may appear in various combinations and subcombinations that will be apparent to one of ordinary skill.

FIG. 2 illustrates a pen-based personal computer (PC) 201 that can be used in accordance with various aspects of the present invention. Any or all of the features, subsystems, and functions in the system of FIG. 1 can be included in the computer of FIG. 2. The pen-based personal computer system 201 includes a large display surface 202, e.g., a digitizing flat panel display, such as a liquid crystal display (LCD) screen, on which a plurality of windows 203 is displayed. Using stylus 204, a user can select, highlight, and write on the digitizing display area and thereby enter electronic ink data into the system. Examples of suitable digitizing display panels include electromagnetic pen digitizers, such as pen digitizers available from Mutoh Co. (now known as FinePoint Innovations Co.) or Wacom Technology Co. Other types of pen digitizers, e.g., optical digitizers, also may be used. The pen-based computing system 201 interprets gestures made using stylus 204 in order to manipulate data, enter text as electronic ink, and execute conventional computer application tasks, such as creating, editing, and modifying spreadsheets, word processing programs, and the like.

The stylus 204 may be equipped with buttons or other features to augment its capabilities. In one example, a stylus 204 could be implemented as a "pencil" or "pen," in which one end constitutes a writing portion and the other end constitutes an "eraser" end, and which, when moved across the display, indicates portions of electronic ink on the display that are to be erased. Other types of input devices, such as a mouse, trackball, keyboard, or the like also could be used. Additionally, a user's own finger could be used as an input device, e.g., for selecting or indicating portions of the displayed image on a touch-sensitive or proximity-sensitive display. Consequently, the term "user input device," as used herein, is intended to have a broad definition and encompasses many variations on well-known input devices.

In various examples, the system provides an ink platform as a set of COM (component object model) services that an operating system and/or an application program can use to capture, manipulate, and store ink and/or other pen actions or events. The ink platform also may include a mark-up language including a language like the extensible markup language (XML). Additional examples of the ink platform may use the DCOM (distributed component object model) implementation. Yet further implementations may be used including the Win32 programming model and the Net programming model from Microsoft Corporation. These platforms are commercially available and known in the art. The electronic ink data may be stored in an ink serialized format ("ISF") or in any other suitable or desired manner, including in conventional manners known to those skilled in the art.

In addition to use with full performance pen-based computing systems or "tablet PCs" (e.g., convertible laptops or "slate" type tablet PCs), aspects of this invention may be used in conjunction with other types of pen-based computing systems and/or other devices that accept data as electronic ink and/or that accept, process, or display electronic pen or stylus input, such as: hand-held or palm-top computing systems; personal digital assistants; pocket personal computers; mobile and cellular telephones, pagers, and other communication devices; watches; appliances; and any other devices or systems that include a monitor or other display device and/or a digitizer that presents printed or graphical information to users and/or allows input using an electronic pen or stylus or that can process electronic ink collected by another device (e.g., a conventional desktop computer that can process electronic ink collected by a tablet PC).

The invention now will be described in conjunction with the remaining figures, which illustrate various examples of the invention and contain information to help explain the invention. The specific figures and information contained in this detailed description should be construed as providing examples of the invention and not as limiting the invention.

IV. Example Systems, Methods, and Computer-readable Media According to the Invention A. General Example Implementations of Systems and Methods According to the Invention As described above, aspects of the present invention relate generally to systems and methods that enhance modification and editing capabilities and other features associated with use of and interaction with electronic documents. At least some advantageous aspects of the invention can be realized when modifying or editing documents containing at least some content generated by recognizer systems, such as handwriting recognition systems, speech recognition systems, and the like, and/or content that may include (or contain access to) other available alternative data, such as alternatives provided by spell-checking or grammar-checking programs, alternatives provided by thesaurus programs, alternatives from storage of personalization or customization data, and the like.

Recently, pen-based computing systems that accept user input via an electronic pen and display it as "electronic ink" have increased in popularity. Use of electronic ink input as opposed to conventional pen and paper is advantageous in many respects. For example, electronic ink input may be electronically stored, filed, and cataloged for future use, which enables it to be easily maintained, located, and shared with others. Additionally, because electronic ink input can be recognized and converted to conventional machine-generated text (e.g., text insertable into, readable by, and useful by conventional computers), it can be electronically stored, searched, and otherwise used on the computer, for example, in conventional word processing documents and programs, in spreadsheets, in email programs, in document management programs, in web browsers, and the like. Handwriting recognition systems are commercially available that allow handwritten electronic ink input to be converted to machine-generated text. One example of a handwriting recognizer is that provided with the Windows XP Tablet PC Edition™ operating system (available from Microsoft Corporation of Redmond, Wash.), although other handwriting recognizers also may be used without departing from the invention.

Typically, when handwritten electronic ink input is being recognized and converted to machine-generated text, for each handwritten word or character string, the recognizer will create a listing or array of one or more characters, words, or character strings believed to correspond to the original handwritten text. The program then will select one of the characters, words, or character strings from the generated listing to display as the recognized machine-generated text (e.g., typically the character, word, or character string believed most likely to be correct, optionally taking into consideration input from an electronic dictionary associated with the recognizer, a language model, conventional grammar rules or other associated language rules, and the like). The remaining characters, words, or character strings in the recognizer's listings (e.g., "potential alternatives" to the recognizer selected character, word, or character string) are maintained and made available to the user, for example, while the recognition program is running, until the next recognition procedure is conducted, during a review or correction procedure relating to the machine-generated text, etc.

In many pen-based computing systems and application programs operating thereon, electronic ink data is parsed into conventional groupings found in the relevant language model. FIG. 3 illustrates an example of a typical data structure 300 associated with electronic ink input data stored in a pen-based computing system. In this example (e.g., useful for English and other Latin-based languages and the like), the electronic ink text may be parsed and stored such that a page, document, or other selection 302 of electronic ink data may include one or more paragraphs or blocks 304 of associated ink data, each paragraph or block 304 may include one or more lines 306 of ink data, each line 306 may contain one or more words or character strings 308 of ink data, and each word or character string 308 may contain one or more individual strokes 310 of ink data (e.g., a stroke corresponding to the digitizer points encountered during movement of the electronic pen between a pen-down event and a pen-up event, or some other suitable or desired collection of electronic ink data).

Of course, the data structure of FIG. 3 constitutes merely one example of a potential data structure for electronic ink data. Many variations and changes can be made to the specific data structure without departing from the invention. For example, the line elements or nodes 306 may be omitted and/or replaced by elements or nodes corresponding to sentences, in order to more closely track the English language model. As another example, the data corresponding to the individual strokes may be stored, for example, as properties in the relevant word elements or nodes 308, and the separate stroke nodes 310 then may be omitted. Data corresponding to the individual words may be stored in a serial fashion without the remaining tree structure, in at least some examples of the invention. Many other variations and changes are possible without departing from the invention. Additionally, if desired, the machine-generated text corresponding to the electronic ink text may share the same or a similar data structure to the electronic ink text, including, for example, the structure shown in FIG. 3. Also, suitable data structures can be developed and applied to other language models and structures, including, for example, East Asian languages, etc.

Various types of information can be stored in the various data elements or nodes 302, 304, 306, 308, and/or 310 in the data structure 300 without departing from the invention. For example, the various elements or nodes may store information regarding the location of their corresponding element on the page or in the document, the ink or text color, the node creation time, the source of the data in the node, the last node edit time, and the like. FIG. 4 illustrates an example data structure (or a portion thereof) for a word node 308 or other word data set that may be used in accordance with at least some examples of this invention. Examples of data or information that may be stored or associated with a word node 308, as illustrated in FIG. 4, may include the word's language; its location on the page or in the document (optionally with respect to other nodes or elements on the page or in the document); a global unique identifier (GUID) identifying the source of this word (e.g., the recognizer, a keyboard, an external source, etc.); pointers to the previous word, the following word, and the parent node that contains the word; a pointer to, an object, or a property containing the strokes or characters contained in the word; and the like. Additionally, word node 308 may maintain data, such as a property, including some or all of the potential alternatives generated by the recognition software when the electronic ink word was recognized. Optionally or alternatively, in at least some examples of the invention, the machine-generated text and the alternative data may come from speech recognition software (if the original input was via speech), a spell-check program, a grammar check program, a thesaurus program, data stored from customization or personalization of a system, and/or from any other suitable source.

Figure 5B:
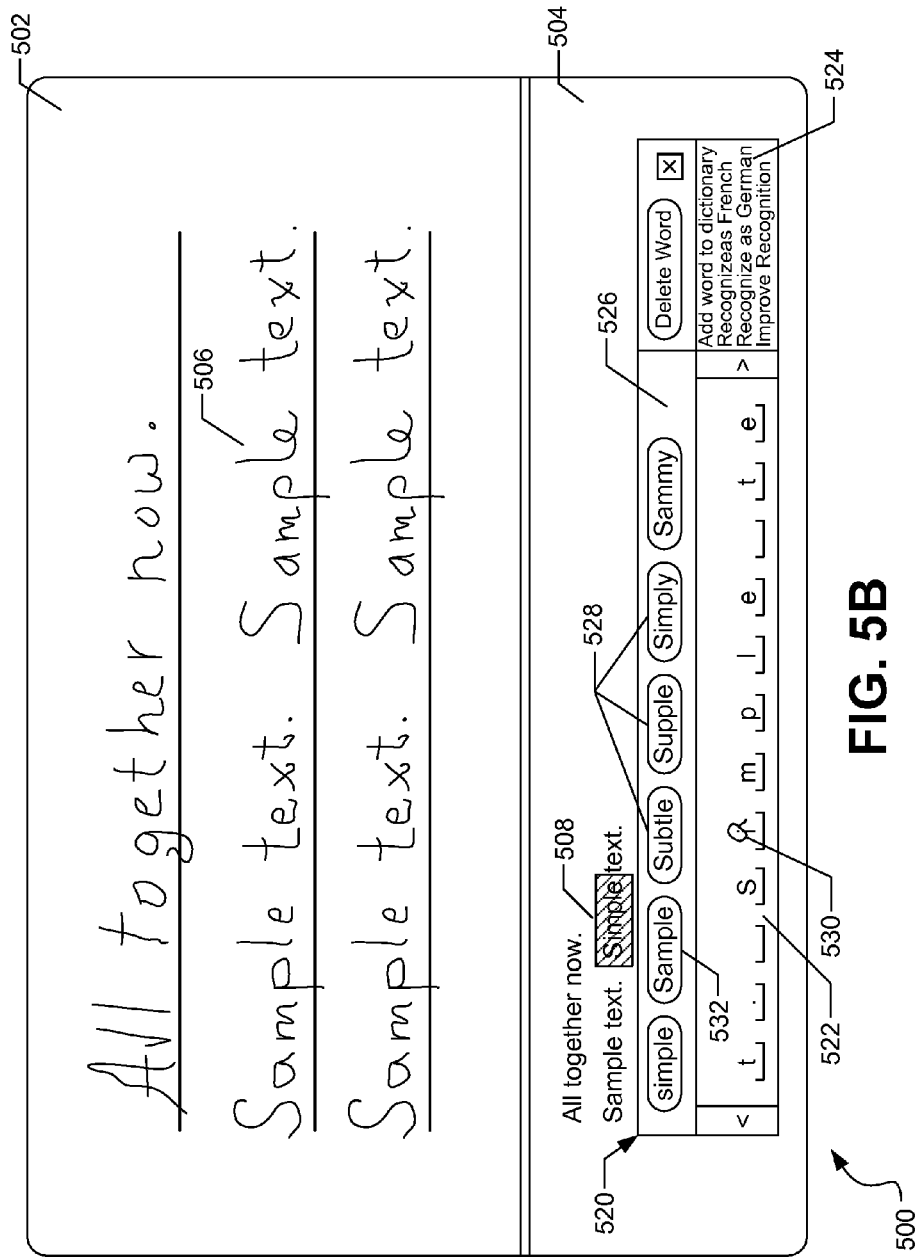

By storing the data corresponding to the various identified alternatives in the data structure, these alternatives can be maintained and associated with the recognized word and can be made available to the user at any desired time, e.g., when editing or modifying the document. FIGS. 5A and 5B illustrate one example. FIG. 5A illustrates an example display screen 500 for an application program that displays and/or accepts electronic ink data. In this example system and method, once the electronic ink data is entered (e.g., in ink-accepting panel 502), the ink data is sent to a handwriting recognition system, and machine-generated text corresponding to the ink data is provided by the handwriting recognition system (e.g., in panel 504). As illustrated in FIG. 5A, the handwriting recognizer in this example has incorrectly recognized the ink word "Sample" 506 and has erroneously provided the machine-generated word "Simple" 508.

When the user selects either the ink word 506 or its corresponding machine-generated word 508 (illustrated in FIG. 5A by hatching over machine-generated word 508), a correction interface 520 appears, e.g., like that illustrated in FIG. 5B. Selection can take place in any suitable or desired manner without departing from the invention, for example, by touching or tapping the digitizer screen with the pen at a location corresponding to either word 506 or 508, by a tap and drag action over the word or words to be selected, by hovering the pen over the digitizer at a location corresponding to either word 506 or 508, by a hover and drag action over the word or words to be selected, and/or in any other manner, including via conventional selection manners known in the art.

The correction interface 520 of this example includes a character-by-character correction portion 522, which opens to include the specifically selected word ("Simple" in this example) and enables changes to individual characters of the selected word using the pen and electronic ink. In the illustrated example, the user has changed the word "Simple" to "Sample" by writing an "a" 530 in electronic ink over the letter "i" in the correction portion 522. This action will cause the new ink corresponding to the letter "a" to be sent to the recognizer and be recognized, and it will cause machine-generated text corresponding to the newly recognized word to be sent to the machine-generated text panel 504 (the originally rendered ink will not be changed in panel 502, although data associated with the ink may be changed, e.g., to reflect the new, corrected machine-generated text). Optionally, if desired, ink or text data relating to one or more characters or words surrounding the newly written character 530 also may be sent to the recognizer, e.g., to provide context and enable dictionary use when recognizing the newly entered ink. Additionally, the correction interface 520 of this example includes an action item or task portion 524 that enables the user to take various actions or perform various functions (e.g., close the correction interface 520, delete the selected word, add the word to the dictionary, recognize the word in another language, define a customized recognition rule with respect to the word, etc.).

The example correction interface 520 of FIG. 5B also includes a suggestion portion 526. This suggestion portion 526 includes icons or other selectable items 528 corresponding to various suggested or alternative characters, words, or character strings available to replace the machine-generated word 508 previously provided by the recognizer. Accordingly, when the user selects the correct word from the suggestion portion 526 (icon 532 corresponding to the word "Sample" in this example), machine-generated text corresponding to the word "Sample" will replace the word "Simple" in panel 504 (the original ink in panel 502 will not be changed, although data associated with it may be changed). In accordance with at least some examples of the invention, the various specific suggestions or alternatives included in and made available through the suggestion portion 526 may be stored in and made available from the data structure for the word 506 and/or the word 508 when the initial handwritten electronic ink was sent to the recognizer (e.g., see the data structure 308 of FIG. 4). Optionally, in at least some examples of the invention, the overall ink text and/or the machine-generated text may have a data tree structure 300 like that illustrated in FIG. 3. As another option, separate data structures for each individual word or character string (or other desired or suitable grouping) may be maintained in any desired manner without using the hierarchical tree structure shown in FIG. 3.

Of course, any suitable or desired correction interface can be used without departing from the invention, and the interface 520 illustrated in FIG. 5B is just one example. For example, if desired, the correction interface, at least initially, may show only the suggestion portion 526 and/or the action portion 524, optionally with the remainder of the interface and/or other portions of the interface available after expiration of an appropriate time and/or upon activation by a user. As another alternative, the correction interface may include an ink input panel in which the user can re-write the selected word in electronic ink, optionally in place of or in addition to the character-by-character correction portion 522 illustrated in FIG. 5B.

By storing the potential alternatives for the recognized words, characters, or character strings (or other desired data), systems and methods according to some examples of the invention can quickly and easily make the various alternatives available to users when the correction interface is activated, which helps (in at least some instances) to make editing, correcting, or changing electronic documents easier, quicker, and more convenient using the electronic pen. As noted above, however, not all application programs will accept and/or maintain data structures that include the potential alternatives or other data, like the data structures shown in FIGS. 3 and/or 4. In such programs, when machine-generated text obtained from a recognizer program is input, the alternative data typically would be lost or deleted and unavailable to the users in the future. Accordingly, the user would be required to make further edits or corrections, if necessary, using conventionally available editing techniques, such as hard and/or soft keyboards as described above, and/or the previously performed recognition or other data generation processes would have to be re-performed, if possible.

Figure 6:
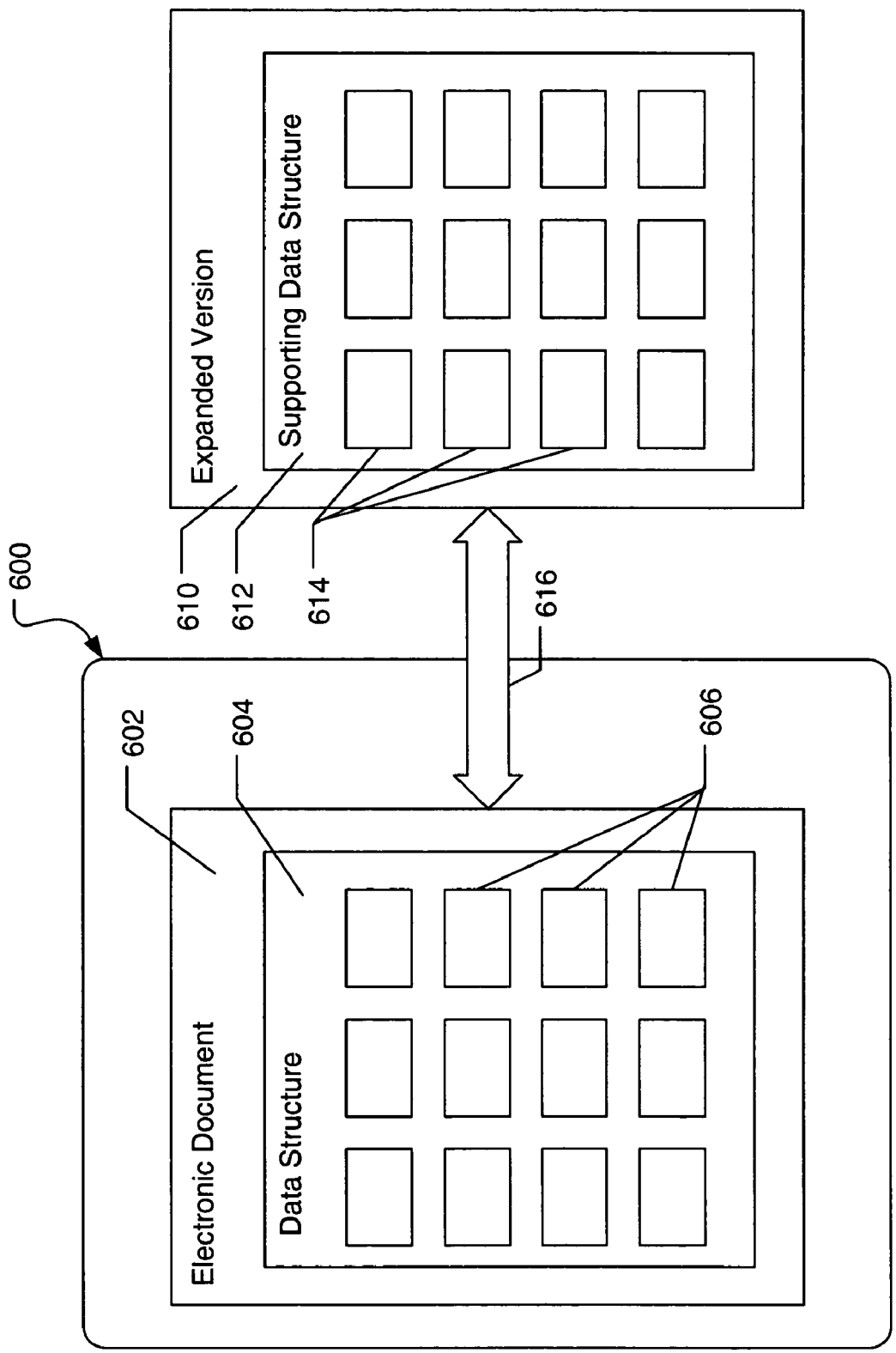
FIG. 6 illustrates the relationship between an electronic document that does not accept and/or process electronic ink or speech input and a supporting data structure that does accept and maintain such input.

Systems and methods according to at least some examples of the invention, however, allow the various alternatives (or other stored data) associated with individual words, characters, or character strings to be maintained and used in the future, even in application programs that do not accept and/or allow interaction with electronic ink data, handwriting recognizers, speech recognizers, and the like. FIG. 6 generally illustrates an example of this aspect of the invention. As illustrated in FIG. 6, an application program 600 maintains an electronic document 602 in its conventional, default format, which includes some type of document data structure 604 that maintains data sets 606 corresponding to individual words, characters, or character strings in the electronic document 602. Notably, the data sets 606 in this example do not include and cannot maintain data associated with potential alternatives generated by a handwriting or speech recognizer (or other recognizer or alternative data of this type).

In systems and methods according to at least some examples of the invention, a separate data structure 610 is maintained corresponding to the electronic document 602 (also called an "expanded version" or a "backing store document" in this specification). This data structure 610 may include a copy of at least some portion of electronic document 602 plus additional supporting data, illustrated in FIG. 6 by supporting data structure 612. The supporting data may include any desired data or information, such as data relating to the potential alternatives (e.g., generated by a recognizer or from any other suitable or desired source) as discussed above. In the illustrated example, independent supporting data sets 614 are maintained that correspond, on a 1:1 basis, with the independent data sets 606 relating to the independent words, characters, or character strings in electronic document 602. Of course, other structures for storing the data sets 606 and supporting data sets 614 may be used without departing from the invention, such as arrays, pointers, hierarchical structures, and the like. Additionally, the supporting data structure 612 need not include a complete copy of the original electronic document 602, although it may. The additional data stored in supporting data sets 614 can be provided in and/or made available to electronic document 602 or its corresponding application program 600, when necessary or called for, as indicated by arrow 616 in FIG. 6 and as will be described in more detail below. The supporting data structure 612 may be maintained by the operating system of a pen-based computing system, independent of application program 600, in at least some examples of the invention.

As mentioned above, the supporting data structure 612 need not include a complete copy of the original electronic document 602 or its same data structure 604. For example, if desired, only a predetermined portion of the electronic document 602 may be saved (e.g., the most recently entered 1000 words), and the alternatives or other data associated with this abbreviated supporting data structure may be made available (e.g., if the user selects a word outside of the stored range, potential alternatives may not be available for the selected word in this example). As another example, each machine-generated word in a document may be stored one time (e.g., the first time it is recognized) along with the potential alternatives generated by the recognition system (and/or other desired data) when it is recognized. When this same word is again recognized in the same document, the potential alternative data may be discarded (or not generated at all), and the potential alternatives from the first occurrence may be relied upon throughout the document (optionally, the data structure may include a pointer to the first occurrence). When a word is selected, e.g., for editing or correction, the systems and methods according to at least some examples of the invention can display the same listing of potential alternatives from the first recognition of the word, irrespective of where that word appears or the number of times it appears in the document. Many other variations in the supporting data structure also are possible without departing from the invention.

Figure 7:
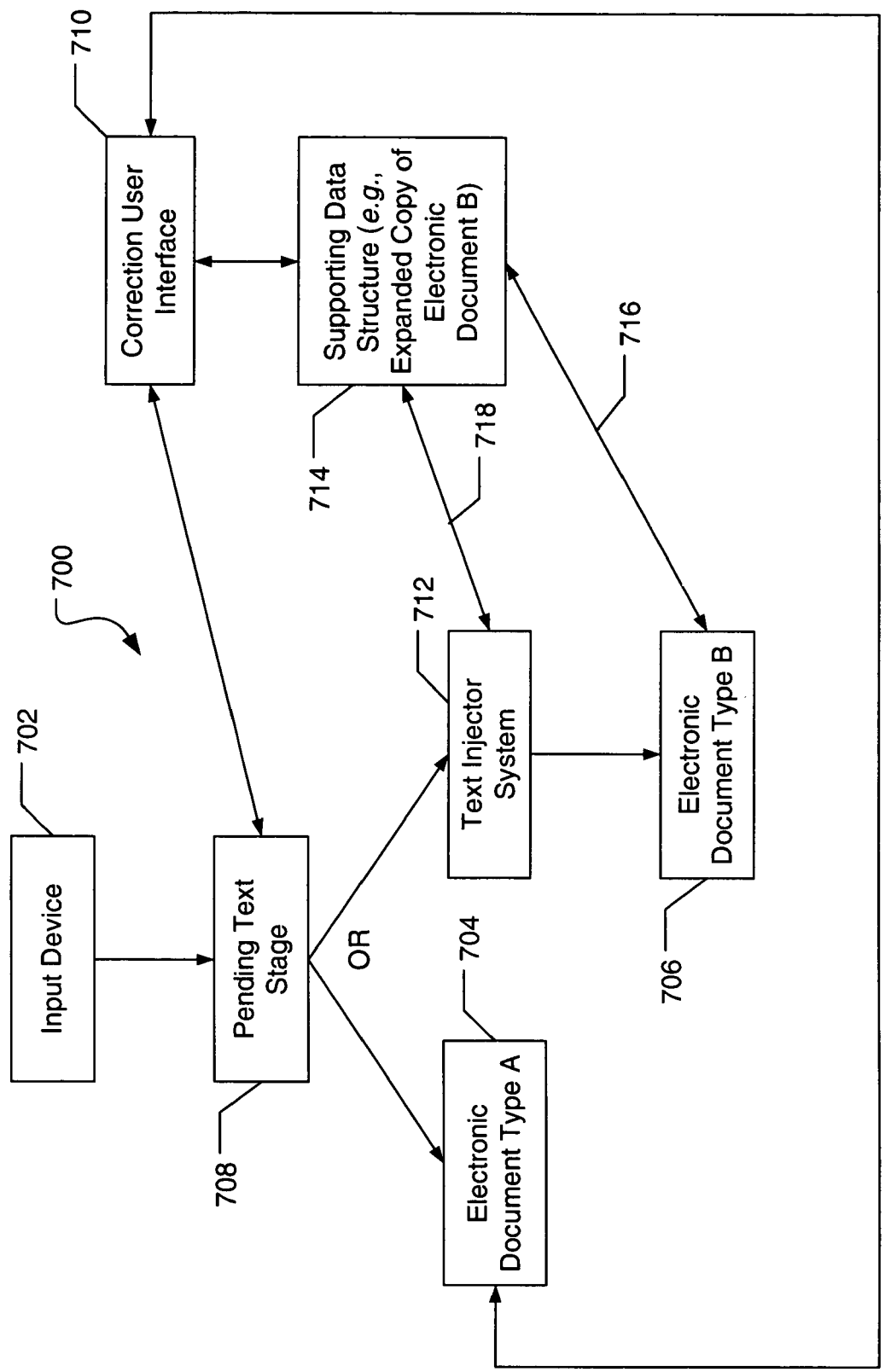
FIG. 7 illustrates example architecture useful in accordance with at least some examples of the invention.

FIG. 7 illustrates example architecture 700 that may be used in some example systems and in practicing some example methods according to the invention. As illustrated, an input device or system 702 provides input ultimately destined for either electronic document type A 704 or electronic document type B 706. The input device 702 may provide input in the form of electronic ink, speech, and/or machine-generated text, and/or it may obtain input from any source, such as from memory, via a network, from handwriting and/or speech recognition software, from an ink input system, from a scanner or facsimile machine, and the like. When this input data includes electronic ink data, other handwritten data, or speech data (or was generated from such data), it may include data structures (e.g., like those illustrated in FIG. 4) in which various alternative data is stored in supporting data set properties (or the like) defined for the individual words, characters, or character strings.

From the input device 702, the data goes to a pending text stage 708. At the pending text stage 708 (or before reaching stage 708), any electronic ink, handwritten, or speech data in the input may be sent to appropriate recognizers (if necessary), in which various alternatives for the words, characters, or character strings and the associated data structures including these alternatives may be generated. Additionally or alternatively, data relating to other potential alternatives (such as from spell-checking programs, grammar checking programs, thesaurus programs, customization or personalization data, or the like) or any other desired data may be generated, associated with one or more words, characters, or character strings, and/or stored in the data structure while in the pending text stage 708, if necessary. As noted above, however, this additional and/or alternative data already may be present and associated with the individual words, characters, or character strings when the data reaches the pending text stage 708.

From the pending text stage 708, the data is ultimately sent to its destination document 704 or 706. If the application program to which the data is to be sent will accept and maintain input data having a data structure with the additional and/or alternative data set properties like those shown in FIG. 4 (e.g., electronic document type A 704), then the input data may be sent directly to the electronic document 704 without further processing. When necessary or desired, a correction interface 710 (like that illustrated at reference number 520 in FIGS. 5A and 5B) can be called up from the application program owning electronic document 704, and the suggestion portion 526 of that correction interface 520 can be populated with specific suggestions 528 and 530 from previously recognized alternative data (data stored directly in document 704), as described above. Of course, if other supporting data is stored and maintained in electronic document 704, that additional supporting data also can be called up and used by the application program owning electronic document 704 in any desired manner.

Of course, as noted above, not all application programs provide or support electronic documents and/or data structures that can accept and/or maintain the additional alternative data (or other data) as described above (e.g., such as electronic document 706 in FIG. 7). In such instances, before the input from pending text stage 708 is sent to the electronic document 706, it is sent to a text injector system 712. The text injector system 712 uses the incoming data (including the alternative data discussed above) to produce and maintain a separate supporting data structure 714. This supporting data structure 714, which may constitute an expanded version or backing store copy of electronic document 706, allows maintenance of and continued access to the additional alternative data and the like, e.g., for use in conjunction with a correction interface 710 (e.g., like that shown in FIGS. 5A and 5B), as will be described in more detail below. Additionally, the text injector 712 strips the additional data out of the incoming input (e.g., the alternative data and the like not supported in electronic document 706's data structure) and moves the stripped down version of the data to electronic document 706. In this manner, the application program and electronic document 706 ultimately receive input data in the form expected, but the alternative data and/or other desired data is not lost and can be used during editing and the like (e.g., it is maintained in supporting data structure 714).

Figure 8:
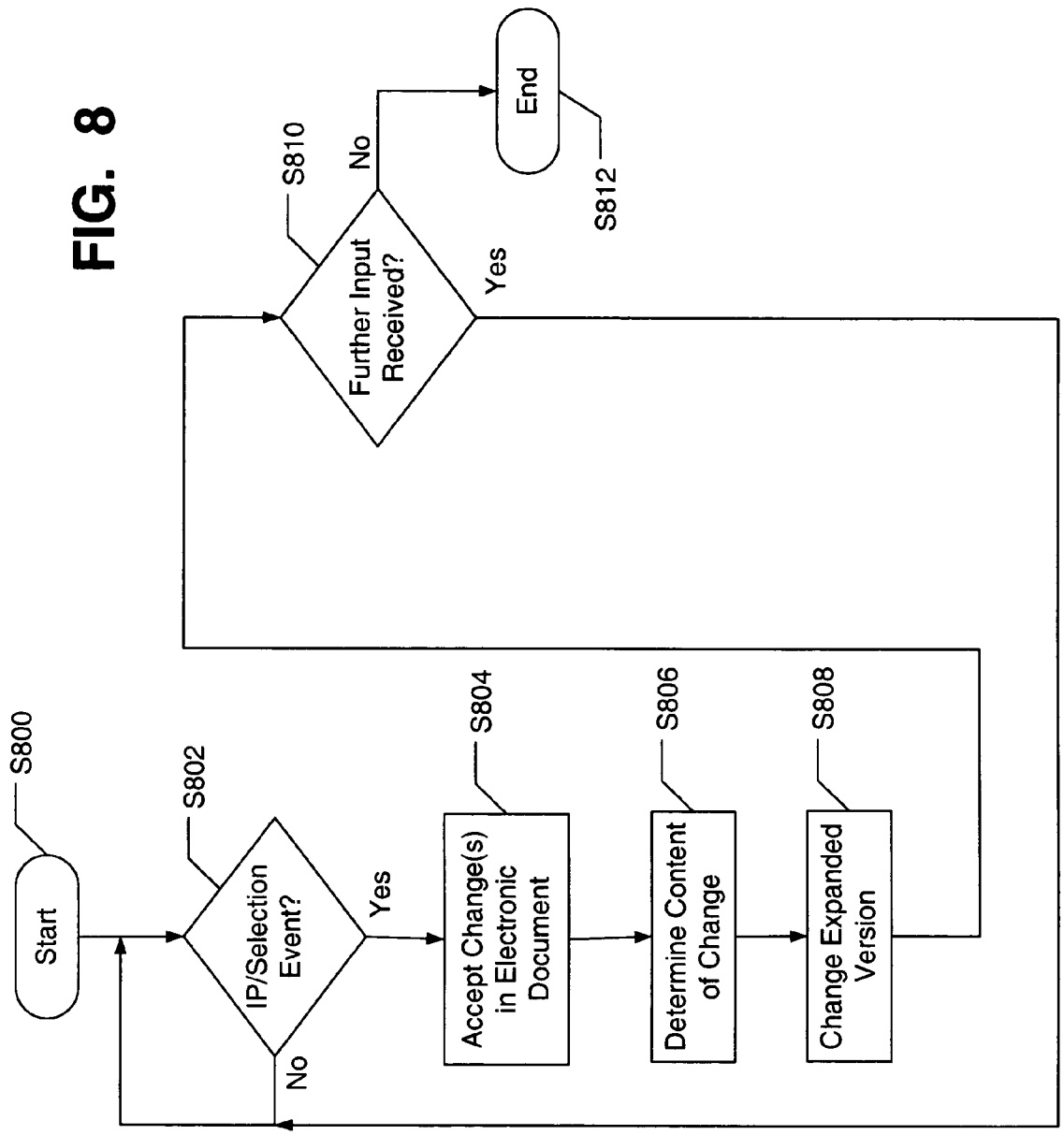
FIG. 8 illustrates an example procedure for providing changes in a supporting document structure based on changes made in an electronic document.

FIG. 8 illustrates an example of procedures involved in maintaining synchronization between electronic document 706 and the expanded version or backing store copy of the electronic document 714. As this example procedure starts (S800), systems and methods according to this example of the invention determine whether an insertion point location change and/or selection event has occurred in the electronic document 706 (S802). If No, the procedure returns to S802 and at a later time again checks for an insertion point location change and/or selection event S802 (optionally, after a predetermined delay and/or other processing). In at least some examples, electronic document 706 or its corresponding application program can send notifications when an insertion point location change and/or selection event occurs. Optionally, on the other hand, systems and methods according to at least some examples of the invention may periodically poll or look for insertion point location changes and/or selection events without departing from the invention.

When an insertion point location change and/or selection event is detected (answer Yes at S802), this may indicate incoming input of some type (text or other data insertion, deletion, or modification; a cursor location change; etc.). The application program accepts the changes (if any) and makes any necessary changes in the electronic document 706 (S804). Once the necessary change(s) is (are) made in electronic document 706, the content of the change(s) is (are) determined (S806) and passed on to the expanded version of the document 714 (S808) (e.g., illustrated by path 716 in FIG. 7). In this manner, the content of the expanded version of the electronic document 714 can be synchronized with the content of electronic document 706.

Systems and methods according to this example of the invention then determine whether further input is/has been received (S810). If No, the procedure may end (S812), and optionally perform other processing and/or resume the present procedure when notified of the next input event, when the next input event is detected, after expiration of a predetermined time period, etc. If additional input is being or has been received (answer Yes at S810), the procedure returns to S802.

Figure 9:
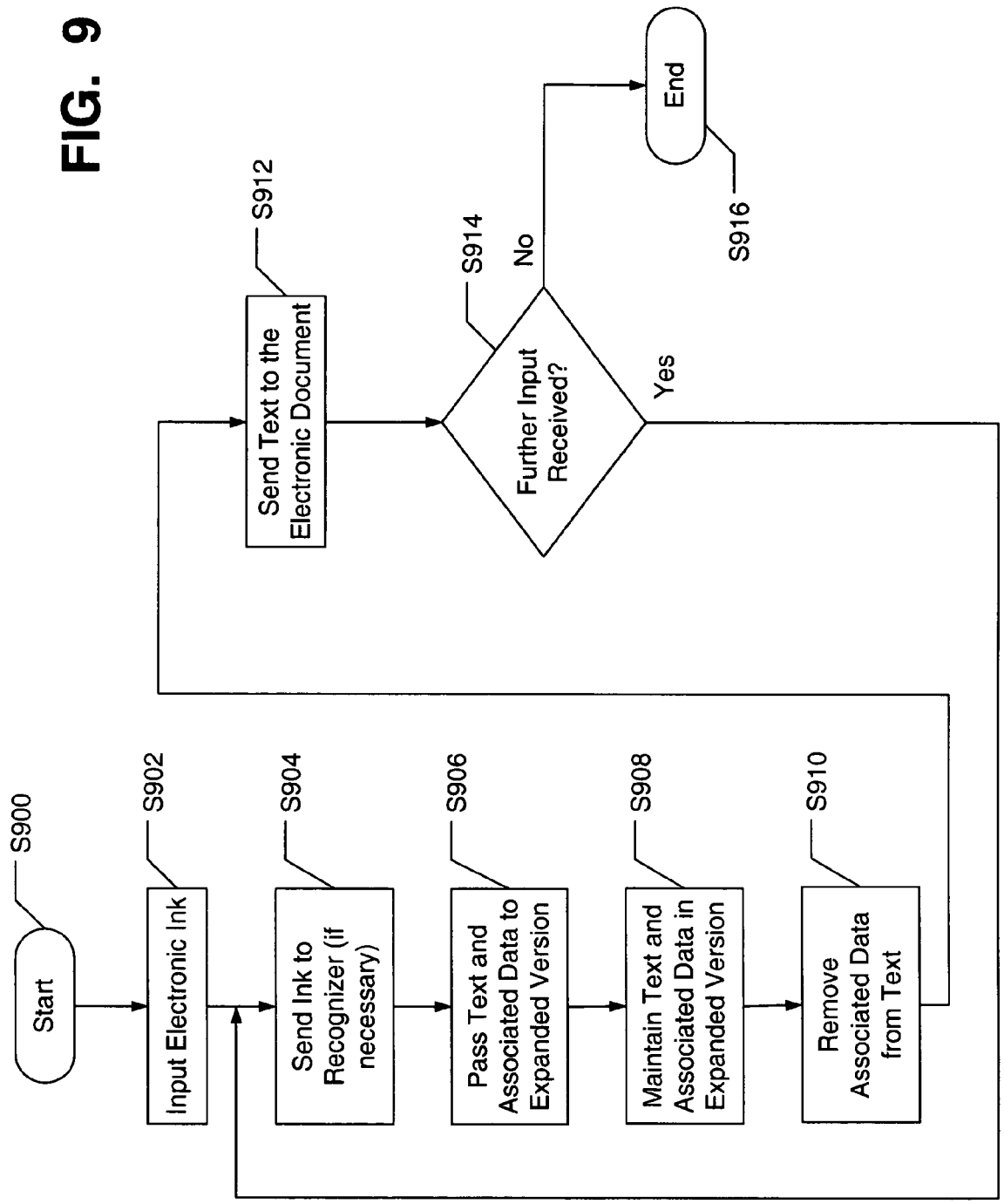
FIG. 9 illustrates an example procedure for providing changes based on electronic ink input in an electronic document that does not accept or process electronic ink data.

Using the procedure described in FIG. 8, the expanded version of the electronic document 714 maintains synchronization with electronic document 706 when changes are made directly in electronic document 706. Such changes directly in electronic document 706 may not have additional data associated with it (such as the alternative data and the like described above), because electronic document 706 cannot directly accept data in that format. Because of the desire to maintain the additional data when available and possible, in at least some examples of systems and methods according to the invention, input including this additional data may be received and/or processed in a different manner. FIGS. 9 and 10 illustrate example procedures that may be used in some examples of systems and methods according to the invention to input and maintain data initially provided using electronic ink (e.g., via a pen-based computing system) into application programs that cannot accept or support electronic ink data. For example, these procedures could be used to enter data and/or corrections into electronic document 706 using electronic ink and/or a pen-based computing system, even though the application program supporting document 706 does not support or accept electronic ink input. Using procedures of this type, in at least some instances, will allow pen-based computing system users to easily, quickly, and conveniently create, edit, or modify documents of essentially any type or format using the pen and electronic ink.

FIG. 9 illustrates an example procedure for inputting data originating from electronic ink input into an electronic document and/or an application program that does not accept or support electronic ink. As the procedure starts (S900), electronic ink input (or data having another desired structure or other desired information) is entered into the computer (S902), e.g., directly from a pen on a pen-based computing system, downloaded from memory or an external source, etc. Such data may be entered through an input device, like input device 702 shown in FIG. 7 (e.g., a digitizer). This ink data is recognized S904 (e.g., by a handwriting recognition engine), which generates a data structure associated with the ink data, for example, like that illustrated in FIG. 4. At this point, the data may be located at the pending text stage 708 in FIG. 7, and it may then be moved to the text injector system 712. Once recognized, the recognized text (optionally including the electronic ink data and/or other associated data) in this example is moved to the supporting data structure (e.g., the expanded version of the electronic document 714) (S906), as also illustrated in FIG. 7 by arrow 718. The supporting data structure 714 supports and maintains the text and associated data (S908), e.g., including data relating to potential alternatives to recognized words, characters, or character strings.

The text injector system 712 then removes the associated data from the incoming input and transforms the data to a format accepted by electronic document 706 (S910). The text is then sent to electronic document 706 (S912). The systems and methods according to this example of the invention then determine whether additional ink input (or other input) is or has been received (S914). If Yes, the procedure returns to S904. If No, the procedure ends (S916), optionally waiting for additional input of some type, performing other processing, etc.

FIG. 10 illustrates an example procedure for entering edits or changes using electronic ink and a pen-based computing system, e.g., using a correction interface like that illustrated in FIGS. 5A and 5B, in an application program and/or an electronic document that will not accept and/or support electronic ink data. As the procedure starts (S1000), the systems and methods according to this example of the invention receive a user's selection (S1002) indicating a potential desire to make changes to a specific word, character, or character string in the electronic document (optionally, if desired, more than one independent word, character, or character string may be selected). As noted above in the discussion of FIGS. 5A and 5B, selection of this type may be indicated, for example, when the electronic pen touches the digitizer at the location of a word, by a touch and drag operation, by a hover event, by a hover and drag operation, or in any other suitable or desired manner.

Once the selection is made, systems and methods according to this example of the invention then determine whether potential alternative or other additional data is provided and available with respect to the selected word or words (S 1004). This may be accomplished, for example, by looking at the supporting data structures 614 stored with respect to the selected word or words (e.g., see FIG. 6) and determining whether an "alternatives" property or other relevant data exists. If Yes, some or all of the possible alternatives are provided to a correction interface (S1006), e.g., to the suggestion portion 526 provided in correction interface 520 of FIG. 5B, optionally in an order indicative of the recognizer's confidence level associated with the alternatives. If No at S1004 (alternatives are not available), S1006 is skipped, and the correction interface (e.g., interface 520) is provided and displayed (S1008) e.g., as an overlay on electronic document 706, optionally, without a suggestion portion, with no options or alternatives provided in the suggestion portion, and/or with no options or alternatives from the recognizer provided in the suggestion portion.

Systems and methods according to this example of the invention then wait for/determine whether the user has made any changes using the correction interface (S1010). Changes may be input to the correction user interface 710 via the input device 702 and pending text stage 708, as illustrated in FIG. 7, via a pen, keyboard or in any desired manner. If changes have been made (answer Yes), e.g., by a user tapping the pen on a suggested alternative, the changes are accepted, optionally recognized using the handwriting or speech recognizer (if necessary), and the changed data (including any new alternatives and the like) is sent to the expanded version of the electronic document 714 (S1012), which maintains the changed version (e.g., changed text) and/or any new data, including new alternatives or other associated data (S1014).

Once the changed information is obtained, systems and methods according to this example of the invention send the changed data from the expanded version of the electronic document 714 to the text injector 712 (S1016), which strips out the alternative or other associated data (if necessary) and places the data in a form and format acceptable by electronic document 706, as generally described above. The stripped down text version of the data then is sent to electronic document 706 (S1018). This procedure maintains electronic document 706 in synch with the expanded version 714 and in synch with changes made via electronic ink (or other appropriate input).

After electronic document 706 has been synchronized and/or updated to reflect changes made in the expanded version 714, systems and methods according to this example of the invention next determine whether any new selections have been made by the user (S1020). If Yes, the procedure returns to S1004 and again goes through the various steps. If No, the procedure ends (S1022), optionally waiting for additional user input or performing any additional processing as may be needed.

If, at S1010, no user made changes are detected (answer No), systems and methods according to this example of the invention then determine whether a selection or correction request is continuing or if a new selection or correction request has been initiated (S1020), and the procedure continues as described above.

While the figures described above illustrate various examples of system and methods according to the invention, those skilled in the art will understand that many changes and modifications to these examples are possible without departing from the invention. Additionally, aspects of the systems and methods described above may be expanded or modified to support speech input, speech recognition, and alternatives provided thereby.

B. Detailed Description of Example Implementations

As mentioned above, some recently released pen-based computing systems run the Windows XP Tablet PC Edition™ operating system (available from Microsoft Corporation of Redmond, Wash.). This operating system gave users the ability to correct recognition errors in electronic documents using a drop-down list that provided various alternatives for a selected word. This drop-down listing, however, was available only in application programs that had been written to support the Text Services Framework (e.g., programs that produced and supported data structures that maintain the recognizer alternatives, like electronic document 704 in FIG. 7). Such programs included: the newest versions of Microsoft's Word® word processing program, Microsoft's Windows Journal ink processing program, and Microsoft's WordPad program. Many previously available and conventional application programs could not take advantage of this feature because they could not accept and support the necessary data structures.

As described above, aspects of this invention expand the ability to use ink and pen-based computing systems to edit documents and to maintain recognizer alternatives for use in documents that do not use, accept, or process ink or speech data and that do not support a data structure including such alternatives. More specifically, aspects of the present invention can be used to enable corrections in any Edit or RichEdit field, any sub-classed Edit or RichEdit field, or any super-classed Edit or RichEdit field, without replacing any existing Edit or RichEdit binary file. Because Edit and RichEdit fields are commonly used throughout the Windows® operating system (available from Microsoft Corporation) and existing application programs, the ability to support editing and corrections in these fields provides very good coverage of existing programs and fields (for example, perhaps 90% of fields). Additionally, at least some examples of the present invention allow users to turn off the functionality, if desired, e.g., at the application program level, edit class level, or specified field level, so the user need not use aspects of the invention or make it available, if desired (e.g., in the event that aspects of the invention are believed to interfere in some manner with proper operation of a specific application program and/or in specific documents).

Basically, systems and methods according to this specific example and implementation of the invention operate as follows. Insertion point location changes and selection events are monitored (as described in more detail below) using the Microsoft Active Accessibility framework that is part of Microsoft's Windows XP Tablet PC Edition™ operating system. Detection of these changes and events allow determination of a new insertion point location and/or a selection event. These systems and methods use conventional Windows® Edit messages (supported by Edit and RichEdit Windows® classes) to determine the insertion point location or text selection within the electronic document and the document's length. This information is used to infer the type of text altering event that occurred in almost all common operations. By tracking the insertion point location changes and selection events, systems and methods according to at least this example of the invention are able to maintain a separate document (like the expanded version of electronic document 714) that mirrors the content of the user-visible document (e.g., a document that does not support the Text Services Framework, like electronic document 706). The separate expanded version of the electronic document is a full Text Services Framework document, so it supports and maintains the alternatives for recognized words injected into the document, e.g., by speech or handwriting recognition or another source. This full Text Services Framework document then may be used by systems and methods according to this example of the invention to provide alternatives for a selected word to present to the user in an appropriate correction user interface, as generally described above.

Various aspects of the above noted systems and methods will be described in more detail. The Text Services Framework on commercially available pen-based computing systems using Microsoft's Windows XP Tablet PC Edition™ operating system contain a mode of operation that supports text injection into existing, non-Text Services Framework type applications. This "text injector" system is known as "Text Services Framework Unaware Application Support," and it is enabled for various 32 bit applications. A Text Services Framework text insertion product will receive notification that a Text Services Framework supported document is active when focus switches to a Text Services Framework Unaware Application Support application. When the text insertion product wants to inject text (e.g., into the Text Services Framework Unaware Application Support application), it injects the text into a Text Services Framework supported document (e.g., the Text Services Framework Unaware Application Support document) in the same way it would if the document was a full Text Services Framework supported document. The Text Services Framework Unaware Application Support then takes that text and causes it to be injected into the actual field of the non-Text Services Framework document.

Because the Text Services Framework Unaware Application Support document is, for all intents and purposes, a full but temporary context, all the usual behaviors of a full Text Services framework document are available when it is used. Therefore, any Text Services Framework text insertion product can monitor this context and receive notifications when it changes. In systems and methods according to at least some examples of this invention, when a text injection into the Text Services Framework Unaware Application Support context is noted, the injection is queried and the text and all associated alternatives data (if any) are copied out (e.g., in a serialized data byte stream to the backing store document).

An insertion point tracking piece is used to monitor changes in the current insertion point location and/or selection events using Microsoft Active Accessibility events, to determine when to investigate changes in an electronic document. When a Microsoft Active Accessibility caret event occurs, Edit messages are used to determine the current insertion point location in the document and the document length. From this information, the type of text change that just occurred in the document often can be inferred. In the cases where the changes cannot be inferred, the expanded version of the electronic document (or the backing store version) is discarded. The following table shows examples of how various insertion point ("IP") location change events can be interpreted in various examples of systems and methods according to the invention:

| Original Element | End Element | Document Length Change | IP Location at Start | IP Location at End | Comments |
|---|---|---|---|---|---|
| IP | IP | +x | P | P + x | Text added at IP Start |
| IP | IP | +x | P | Not P + x | Lost Synchronization |
| IP | IP | None | P | P | IP Location Change or Nothing Happened |
| IP | IP | −1 | P | P − 1 | Character before IP deleted by backspace |
| IP | IP | −1 | P | P − 1 (on previous line) | Carriage return before IP deleted by backspace |
| IP | IP | −2 | P | P − 2 (on previous line) | Carriage return/line feed pair deleted by backspace |
| IP | IP | −1 | P | P | Following character deleted |
| IP | IP | −1 (−1 Line) | P | P | Following carriage return deleted |
| IP | IP | −2 (−1 Line) | P | P | Following carriage return/line feed pair deleted |
| IP | IP | All Others | | | Lost Synchronization |

The following table shows how various selection events can be interpreted in systems and methods according to some examples of the invention:

| Original Element | End Element | Change in Document Length | IP Location at End | Comments |
| --- | --- | --- | --- | --- |
| IP | Selection | +x | None | Lost Synchronization |
| IP | Selection | 0 | None | Selection Made |
| IP | Selection | −x | None | Lost Synchronization |
| Selection | IP | +x | Selection end + x | Selection replaced by larger text |
| Selection | IP | +x | Not Selection end + x | Lost synchronization |
| Selection | IP | 0 | Selection Start | Selection collapsed to IP Start |
| Selection | IP | 0 | Selection End | Ambiguous: Selection collapsed to IP End or Selection Replaced with identical sized text |
| Selection | IP | 0 | Elsewhere | IP moved, canceling selection |
| Selection | IP | −x | Selection Start | Selection deleted |
| Selection | IP | −x | Selection Start + selection length − x | Selection replaced with shorter text |
| Selection | IP | −x | All others | Lost Synchronization |
| Selection | Selection | 0 | None | Ambiguous: No operation or Selection replaced by same length selection |
| Selection | Selection | +x | None | Lost Synchronization |
| Selection | Selection | −x | None | Lost Synchronization |

Almost all user operations can be determined easily, and the Text Services Framework document (like the expanded copy of the electronic document 714) can be adjusted easily based on this information to keep it in full synchronization with the non-Text Services Framework document (like electronic document 706). In the few cases where the changes are ambiguous and determining what actually occurred may be computationally expensive and/or slow (e.g. selecting the entire document), it is not necessary for systems and methods to attempt to maintain synchronization of all portions. Rather, in such situations, synchronization over smaller portions or regions of the document may be maintained and checks for synchronization and potential available alternatives may take place on a smaller portion of the entire document. As another alternative, when later smaller ranges or regions of the document are selected (e.g., for making edits or corrections), synchronization can be checked at that time over the smaller range or selection, and updates to the Text Services Framework based document can be made, if necessary, if synchronization does not exist. This action would eliminate any stored alternatives for that range and result in reporting no alternatives to the calling application program when the correction interface was activated over that region. However, in this manner, overly time consuming synchronization can be avoided without incorrectly reporting that alternatives when they do not exist.

When an explicit "lost synchronization" result is obtained, this may be due to the application programmatically changing the text in the edit field (e.g., by scrolling up and/or down a set of possible fonts in a font combo box field). Such situations typically will result in loss of all saved alternatives anyway because the text will be changed.

Once systems and methods according to this example of the invention have determined the text changes that have occurred, the Text Services Framework document (e.g., like the expanded version or backing store version of electronic document 714) will be updated to match the changes. To do so, the set of stored Text Services Framework Unaware Application Support text insertions is reviewed. If the stored Text Services Framework Unaware Support Application text insertions match the changed text, the text in the Text Services Framework document is replaced with the text+alternatives from the Text Services Framework Unaware Support application data. If a partial match of this text insertion data is found, the data is maintained to match against the next text change in the document (e.g., to check changes in a character-by-character manner). If no match is then found, the data is discarded and the Text Services Framework document is not updated.

The Text Services Framework document is owned by the operating system (not the application program), so the operating system provides the correct screen location when requested by a Text Services Framework document's text insertion product. Therefore, when the text insertion product is asked to display an alternatives list or a suggestion list, the list will appear in the correct screen location as if the field itself were in a Text Services Framework document.

When a change is made in the Text Services Framework backing store document that is not a result of electronic document to backing store document synchronization (e.g., changes coming through the correction user interface), this change must be passed to the original electronic document. Such changes in the backing store document may be monitored using the conventionally available Text Services Framework application programming interfaces ("APIs"). When a change occurs, a Windows Edit Messages is used to effect the appropriate change in the original electronic document. When the original electronic document is changed in this manner, the changes are not passed back to the backing store document for synchronization.

Accordingly, in this manner, changes in both directions (to both the original electronic document and the backing store document) may be tracked and synchronized into the other document.

As an alternative, instead of using the Microsoft Active Accessibility framework to track insertion point location and/or selection events, it may be possible to use Edit/RichEdit windows and detect the insertion point movements that way. In such a system, Windows messages still could be used for determining the specific text change that occurred.

C. Additional Features Relating to Examples of the Invention

Aspects of the invention expand the availability and functionality of pen-based computing systems to use electronic pens and electronic ink to edit many different types of documents, including documents that do not directly support or accept electronic ink input or data. As described above, even for documents that do not accept or support electronic ink data, a user can input electronic ink via a correction interface or other ink entry panel or program, the ink can be recognized, data corresponding to potential alternatives associated with the recognized ink can be stored in a separate backing store document, and the recognized text can be pumped into the original document, i.e., into the application program and/or electronic document that does not directly accept the electronic ink. Therefore, in accordance with at least some examples of the invention, there is a need to move data that includes machine-generated text from recognized electronic ink or speech data as well as potential alternatives associated with that text (e.g., alternatives stored as a property of the individual ink or text word or character string). Additionally, if desired, the backing store document further may create and store an object including the original raw ink data (e.g., in conventional ink serialized format ("ISF") or any other suitable or desired format) as well as spacing instructions for the start and/or end of the word or character string. By keeping the original ink data, the ink can be re-recognized, if necessary, optionally taking into account user made changes to the recognized text (e.g., changes made through a correction interface like that illustrated in FIGS. 5A and 5B, changes made by speech input, etc.), in order to further improve the recognition results.

Various movements of the text, ink, alternatives and/or associated data may be used in some aspects of the invention. For example, the text, ink, alternatives and/or other associated data may be moved: (a) from a "pending text" area associated with a handwriting input interface (e.g., a Latin skin, an East Asian skin, etc.) to the electronic document and/or to the backing store electronic document; (b) from the electronic document and/or the backing store document to one or more portions of a correction interface (e.g., the character-by-character correction portion 522, the task portion 524, or the suggestion portion 526 of the example shown in FIG. 5B); or (c) from a "pending text" area on a handwriting input interface (e.g., a Latin skin, an East Asian skin, etc.) to one or more portions of a correction interface (e.g., the character-by-character correction portion 522, the task portion 524, or the suggestion portion 526 of the example shown in FIG. 5B).

Examples of various features included in at least some examples of the invention include: (a) sending the handwritten ink objects plus alternative data from the pending text area (e.g., Latin, East Asian, or other text), optionally with autospacing instructions (or other data) to the backing store document and maintaining it in the backing store document to allow correction by the end user both before and after the data is injected into an electronic document that does not support saving the additional data; and (b) as above in part (a) but between a text injector system and the backing store document.

The correction interface also may include various features without departing from the invention. For example, the correction interface may allow the original machine-generated text to be displayed to the user and allow the user to write over the machine-generated text, using electronic ink, on a character-by-character basis, to produce the correct results (e.g., as shown at 530 in correction portion 522 of FIG. 5B). As another example, the correction interface may include an inking area that allows a user to freehand input electronic ink data (not limited to a character-by-character basis). When character-by-character edit capability is available (as in correction portion 522), the handwriting recognition system also may allow display and selection of alternatives for individual characters, if desired.

Also, in at least some examples of systems and methods according to the invention, the correction interface and other features of the systems and methods may store the language of the incoming ink or speech data, to enable user selection of the language of the input, the dictionary to use during recognition, and the like, optionally on a word-by-word basis.

As mentioned above, in accordance with at least some examples of the invention, the original ink data is maintained with the recognized text (e.g., as a property or object) so that the ink can be recognized, if necessary or desired, optionally taking into account user made changes to the recognized text (e.g., made through a correction interface like that illustrated in FIGS. 5A and 5B), in order to further improve the recognition results. Even when the text is corrected or changed by the user, in at least some examples, the original ink and alternatives (potentially updated alternatives, if re-recognition has occurred) will be maintained with the recognized or corrected text. Re-recognition also may take place in situations, taking into account a user's changes, for example, where a user has broken a single recognized text word into two or more words (e.g., by inserting a space between characters via correction portion 522) and/or where a user has grouped two or more recognized words into a single word (e.g., by deleting blank spaces between recognized words using correction portion 522).

When re-recognition occurs, for example, when a new language is selected for a word or grouping of words, when spaces are inserted or deleted between characters, when one or more characters are changed by a user, as described above, the suggestion list (e.g., in suggestion portion 526) also may be updated based on the new recognition results. In this manner, the specific suggestions provided may better reflect the user's original intent. Additionally, in at least some examples of systems and methods according to the invention, if a task list is provided in the correction interface (e.g., like task portion 524), it also may be updated to reflect user made changes and/or re-recognition for the various reasons described above. For example, add/remove from dictionary tasks may be displayed, activated, and/or deactivated, as appropriate, based on user made corrections and the re-recognition results. Available alternative language dictionaries may be displayed, activated, and/or deactivated based on changes to the designated language.

The correction interface (e.g., like interface 520), when present, may take on any desired form and appear at any desired location without departing from the invention. For example, in at least some examples of the invention, the interface may appear near or adjacent either the ink or machine-generated text word or character string being selected. The interface may appear as a pop-up window or the like that overlays the original electronic ink document.

While the specific examples of the invention described above are optimized for processing electronic ink data and machine-generated text in the form of conventional English and other Latin-based words, characters, and text (e.g., read left to right and top to bottom), the invention is not limited to use on those types of languages and on that type of electronic ink data and machine-generated text. Those skilled in the art will recognize that aspects of this invention can be applied to any type of electronic ink data and/or machine-generated objects, including handwritten text or characters in any language and written or read in any direction without departing from the invention. Additionally, aspects of this invention can be applied to recognition and processing of other types of data and machine-generated objects without departing from the invention, such as data and elements in charts, diagrams, graphs, flowcharts, etc.; musical data or symbols; mathematical or scientific data or symbols; drawings; speech; etc.

Also, in accordance with at least some examples of the invention, personalization or customization information may be stored with respect to certain ink, speech, or other input. For example, certain pen gestures, words, or phrases could be designated as corresponding to predetermined input data, and this input data may be stored or accessed through the supporting data structure. As a more specific example, speaking or writing the words "sincerely, et al.," may be defined in the system as a request to input certain predetermined information (such as a signature block for a letter), and data stored in the supporting data structure associated with this spoken or written phrase may contain, point to, or otherwise provide access to the desired closing information and data. Customization and personalization information also can be developed and recognized by the system as a result of repeated user made changes or corrections without departing from the invention.

Finally, the present invention also relates to computer-readable media including computer-executable instructions stored thereon for providing correction interfaces, for performing various methods, and/or for use in various systems, including the correction interfaces, systems, and/or methods described above. The computer-readable media may constitute computer-executable instructions stored on the various specific examples of computer-readable media described above.

V. Conclusion

Various examples of the present invention have been described above, and it will be understood by those of ordinary skill that the present invention includes within its scope all combinations and subcombinations of these examples. Additionally, those skilled in the art will recognize that the above examples simply exemplify various aspects of the invention. The various specific steps and/or architectural elements described above can be changed, functions may be added, deleted, combined, and/or changed in order without departing from the invention. Thus, various changes and modifications may be made without departing from the spirit and scope of the invention, as defined in the appended claims.

The invention claimed is:

1. A computer-implemented method of modifying an electronic document using a computing system having processor, memory, and data storage subsystems, the computer-implemented method, comprising:
   maintaining an electronic document, wherein at least a first portion of content in the electronic document includes content generated by a user via an input device and the content converted by a recognizer to recognized content as standard text;
   obtaining data associated with the recognized content, wherein the data is stored in a data structure directly linked to the recognized content that includes information not included in the electronic document, the data structure including a plurality of different linked nodes, where each linked node stores additional information related to the data stored in the linked node including a location within the electronic document of the recognized content and a global unique identifier that identifies a source of the recognized content;
   receiving from the user, an input selecting a segment of the first portion of the content or the recognized content;
   providing to the user, at least one selectable alternative for the first portion of the content or recognized content selected by the user based at least in part on the data associated with the first portion where the user can modify the recognized content with the at least one selectable alternative; wherein:
      the data associated with the first portion of the content includes an expanded version and a supporting data structure of the electronic document separate from the electronic document, and a text injector strips alternative data from the expanded version of the electronic document and sends a stripped down text version of the data to the electronic document;
      the expanded version and the supporting data structure are exclusively linked to the data structure of the electronic document, the expanded version and the supporting data structure being saved separate from the electronic document and made directly available to the user upon subsequent access of the electronic document; and
      the data associated with the first portion of the content includes properties associated with the first portion of the content that are not included in the electronic document; and
   maintaining synchronization between a received change in the content of the electronic document and an associated change in the content of the expanded version and the supporting data structure.

2. The computer-implemented method according to claim 1, further comprising:
   changing the content of the electronic document when one of the selectable alternatives is selected.

3. The computer-implemented method according to claim 1, wherein the first portion of the content is provided by a handwriting recognizer.

4. The computer-implemented method according to claim 3, wherein the data associated with the first portion of the content includes one or more potential alternative characters, words, or character strings identified by the handwriting recognizer.

5. The computer-implemented method according to claim 1, wherein the first portion of the content includes a word, character, or character string generated by a handwriting recognizer, and the data associated with the first portion of the content includes one or more potential alternative words, characters, or character strings generated by the handwriting recognizer.

6. The computer-implemented method according to claim 1, further comprising:
   receiving input changing the stored data associated with the first portion of the content of the electronic document; and
   changing the electronic document, if necessary, based on the input changing the stored data associated with the first portion of the content of the electronic document.

7. A computer-storage medium including computer-executable instructions stored thereon for performing the computer-implemented method of claim 1.

8. A computer-implemented method of editing an electronic document using a computing system having processor, memory, and data storage subsystems, the computer-implemented method, comprising:
   receiving input in an electronic document via an input device, wherein the electronic document includes a data structure having a plurality of independent data sets, the input being converted by a recognizer to standard text data;

maintaining a supporting data structure that minors content of a user-visible document which is based on content in at least a portion of the electronic document and the converted standard text data, wherein the supporting data structure includes a plurality of supporting data sets such that at least some of the independent data sets in the electronic document and the converted standard text data are directly linked to an associated supporting data set in the supporting data structure, wherein:

the data structure includes a plurality of different linked nodes, where each linked node stores additional information related to data stored in the linked node including a location within the electronic document of recognized content and a global unique identifier that identifies a source of the recognized content, and the supporting data structure is directly linked to the data structure of the electronic document, and the supporting data structure is saved and made available to a user upon subsequent access of the electronic document;

receiving input requesting display of or access to information contained in at least one supporting data set;

receiving input selecting information from the at least one supporting data set;

changing the electronic document based on the selected information from the at least one supporting data set; wherein:

the supporting data structure includes an expanded version of the electronic document containing data that is not accepted or supported by the electronic document, the supporting data structure being maintained separate from and exclusively linked to the electronic document, and at least some of the supporting data sets include one or more properties associated with its corresponding independent data set in the electronic document, and wherein the properties are not stored in the data structure of the electronic document; and maintaining synchronization between the content of the electronic document and the content of the expanded version, wherein a change to the content of the expanded version changes the electronic document accordingly.

9. The computer-implemented method according to claim 8, wherein at least some of the independent data sets correspond to words, characters, or character strings in the electronic document.

10. The computer-implemented method according to claim 9, wherein at least some of the supporting data sets store potential alternative words, characters, or character strings corresponding to the words, characters, or character strings stored in the associated independent data sets.

11. The computer-implemented method according to claim 10, wherein the potential alternative words or characters stored in the supporting data sets are generated by a recognizer.

12. The computer-implemented method according to claim 8, wherein at least some of the supporting data sets include one or more properties associated with its corresponding independent data set in the electronic document, wherein the properties are not stored in the data structure of the electronic document.

13. The computer-implemented method according to claim 12, wherein the one or more properties includes at least one member selected from the group of: handwriting recognizer generated alternative words, characters, or character strings; speech recognizer generated alternative words, characters, or character strings; language of a word, character, or character string; identifier of a word, character, or character string source; original electronic ink data associated with a word, character, or character string; time of input of a word, character, or character string; and spacing data associated with a word, character, or character string.

14. The computer-implemented method according to claim 8, further comprising:

receiving input changing the supporting data structure; and changing the electronic document based on the input changing the supporting data structure.

15. A computer-storage medium including computer-executable instructions stored thereon for performing the computer-implemented method of claim 8.

16. A computer-implemented electronic document modification system having processor, memory, and data storage subsystems, the computer-implemented system, comprising:

a processor programmed and adapted to: (a) maintain an electronic document, wherein at least a first portion of content in the electronic document includes content generated by a user via an input device and the content converted by a recognizer to recognized content as standard text, and (b) obtain data associated with the recognized content; and a text injector system to strip additional data from incoming input that is not supported in a data structure of the electronic document and move the stripped additional data to a supporting data structure, wherein:

the data is stored in the data structure directly linked to the recognized content that includes information not included in the electronic document, the data structure including a plurality of different linked nodes, where each linked node stores additional information related to the data stored in the linked node including a location within the electronic document of the recognized content and a global unique identifier that identifies a source of the recognized content;

the input device receives by the user, a selection of a segment that optionally includes the first portion of the content or the recognized content, the processor further is programmed and adapted to provide to the user, at least one selectable alternative for the first portion of the content or the recognized content selected by the user based at least in part on the data associated with the first portion where the user can modify the recognized content with the at least one selectable alternative;

the data associated with the first portion of the content includes an expanded version of the electronic document separate from the electronic document;

the expanded version is directly and exclusively linked to the electronic document, and the expanded version is saved and made available to the user upon subsequent access of the electronic document;

the data associated with the first portion of the content includes properties associated with the first portion of the content that are not included in the electronic document; and the processor further is programmed and adapted to maintain synchronization between changes to either the content of the electronic document or the expanded version.

17. The computer-implemented system according to claim 16, wherein the processor further is programmed and adapted to change the content of the electronic document when one of the selectable alternatives is selected.

18. The computer-implemented system according to claim 16, wherein the first portion of the content of the electronic document is provided by a handwriting recognizer.

19. The computer-implemented system according to claim 18, wherein the data associated with the first portion of the content of the electronic document includes one or more potential alternative words, characters, or character strings identified by the handwriting recognizer.

20. The computer-implemented system according to claim 16, wherein the first portion of the content of the electronic document includes a word, character, or character string generated by a handwriting recognizer, and the data associated with the first portion of the content of the electronic document includes one or more potential alternative words, characters, or character strings generated by the handwriting recognizer.

21. The computer-implemented system according to claim 16, wherein the processor further is programmed and adapted to receive input including a change to the content of the electronic document, and to change the stored data associated with the first portion of the content of the electronic document, if necessary, based on the change to the content of the electronic document.

22. The computer-implemented system according to claim 16, wherein the processor further is programmed and adapted to receive input changing the stored data associated with the first portion of the content of the electronic document, and to change the electronic document, if necessary, based on the input changing the stored data associated with the first portion of the content of the electronic document.

23. A computer-implemented modification system having processor, memory, and data storage subsystems, the computer-implemented system comprising:
   a processor programmed and adapted to:
   (a) receive input in an electronic document via an input device, wherein the electronic document includes a data structure having a plurality of independent data sets, the input being converted by a recognizer to standard text data, and
   (b) maintain a supporting data structure based on recognized content in at least a portion of the electronic document and the converted standard text data, wherein the supporting data structure and the converted standard text data includes a plurality of supporting data sets such that at least some of the independent data sets and/or converted standard text data in the electronic document are directly linked to an associated supporting data set in the supporting data structure, wherein the data structure includes a plurality of different linked nodes, where each linked node stores additional information related to data stored in the linked node including a location within the electronic document of the recognized content and a global unique identifier that identifies a source of the recognized content;
   an input device adapted to receive input requesting display of or access to information contained in at least one supporting data set;
   input of selected information from the at least one supporting data set; and
   a revised electronic document based on the selected information from the at least one supporting data set;
   wherein:
      the supporting data structure includes an expanded version of the electronic document maintained separate from the electronic document;
      the supporting data structure is exclusively linked to the electronic document, and the expanded version is saved and made available to a user upon subsequent access of the electronic document;
      at least some of the supporting data sets include one or more properties associated with its corresponding independent data set in the electronic document;
      the properties are not stored in the data structure of the electronic document; and
      the processor further is programmed and adapted to maintain synchronization between changes to either the content of the electronic document or the expanded version, wherein ambiguous input changes are synchronized over smaller portions to check for potential available alternatives.

24. The computer-implemented system according to claim 23, wherein the processor further is programmed and adapted to receive input selecting information from the at least one supporting data set, and change the electronic document based on the selected information from the at least one supporting data set.

25. The computer-implemented system according to claim 23, wherein at least some of the independent data sets correspond to words, characters, or character strings in the electronic document.

26. The computer-implemented system according to claim 25, wherein at least some of the supporting data sets store potential alternative words, characters, or character strings corresponding to the words, characters, or character strings stored in the associated independent data sets.

27. The computer-implemented system according to claim 26, wherein the potential alternative words, characters, or character strings stored in the supporting data sets are generated by a recognizer.

28. The computer-implemented system according to claim 23, wherein at least some of the supporting data sets include one or more properties associated with its corresponding independent data set in the electronic document, wherein the properties are not stored in the data structure of the electronic document.

29. The computer-implemented system according to claim 28, wherein the one or more properties includes at least one member selected from the group of: handwriting recognizer generated alternative words, characters, or character strings; language of a word, character or character string; identifier of a word, character, or character string source; original electronic ink data associated with a word, character, or character string; time of input of a word, character, or character string; and spacing data associated with a word, character, or character string.

30. The computer-implemented system according to claim 23, wherein the processor further is programmed and adapted to receive input changing the supporting data structure, and to change the electronic document based on the input changing the supporting data structure.

31. The computer-implemented method of claim 1, wherein the input device comprises one of an electronic pen device and a touch-sensitive input device.

32. The computer-implemented method of claim 8, wherein the input device comprises one of an electronic pen device and a touch-sensitive input device.

33. The computer-implemented system of claim 16, wherein the input device comprises one of an electronic pen device and a touch-sensitive input device.

34. The computer-implemented system of claim 23, wherein the input device comprises one of an electronic pen device and a touch-sensitive input device.

* * * * *